United States Patent [19]

Ozaki

[11] Patent Number: 5,787,757
[45] Date of Patent: Aug. 4, 1998

[54] BICYCLE SPEED CHANGE OPERATION DEVICE

[75] Inventor: Nobuo Ozaki, Suminoe-ku, Japan

[73] Assignee: Sugino Cycle Industries, Ltd., Nara, Japan

[21] Appl. No.: 624,605

[22] PCT Filed: Aug. 1, 1995

[86] PCT No.: PCT/JP95/01531

§ 371 Date: Apr. 2, 1996

§ 102(e) Date: Apr. 2, 1996

[87] PCT Pub. No.: WO96/04167

PCT Pub. Date: Feb. 15, 1996

[30] Foreign Application Priority Data

Aug. 2, 1994 [JP] Japan .................................. 6-201440

[51] Int. Cl.$^6$ .......................... B62K 23/02; B62M 25/04; G05G 5/06
[52] U.S. Cl. ........................ 74/473.13; 74/489; 74/502.2
[58] Field of Search .................... 74/475, 489, 502.2, 74/523, 527, 473.13, 473.14, 473.27

[56] References Cited

U.S. PATENT DOCUMENTS

| | | | |
|---|---|---|---|
| 4,267,744 | 5/1981 | Yamasaki | 74/489 |
| 4,744,265 | 5/1988 | Nagano | 74/523 |
| 4,966,046 | 10/1990 | Tagawa | 74/502.2 |
| 5,020,387 | 6/1991 | Nagano | 74/475 |
| 5,390,565 | 2/1995 | Tagawa et al. | 74/502.2 |

FOREIGN PATENT DOCUMENTS

| | | |
|---|---|---|
| 62-29486 | 2/1987 | Japan . |
| 63-269795 | 8/1988 | Japan . |
| 64-36595 | 2/1989 | Japan . |
| 1-182188 | 7/1989 | Japan . |
| 5-32190 | 2/1993 | Japan . |

Primary Examiner—Charles A. Marmor
Assistant Examiner—Troy Grabow
Attorney, Agent, or Firm—Merchant, Gould, Smith, Edell, Welter & Schmidt

[57] ABSTRACT

A bicycle speed change operation device includes a built-in stepwise positioning mechanism which is capable of setting an appropriate overshift for each speed step. The speed change operation device includes a support member, an operation member supported for rotation about an axis of the support member and operated to pull and pay out one end of a cable, an engaging member provided on one of the support member and the operation member, and a positioning member (7) provided on the other of the support member and the operation member and having plural engaging portions (72a–72c). The engaging member successively comes into elastic positioning engagement with the plural engaging portions (72a–72c) upon rotation of the operation member. The positioning member (7) is divided into plural parts (7a, 7b), and the plural engaging portions (72a–72c) are divided into plural groups each carried by a divided part of the positioning member. The plural parts of the positioning member including a first part (7a) which is loosely movable about an axis of the support member within a predetermined angle relative to the member on which the positioning member (7) is provided, and a second part (7b) which is loosely movable about the axis of the support member within a predetermined angle relative to the first part (7a) or the support member.

12 Claims, 27 Drawing Sheets

BICYCLE SPEED CHANGE OPERATION DEVICE

TECHNICAL FIELD

This invention relates to a bicycle speed change operation device which is provided at a suitable portion of a bicycle frame or handlebar for remotely operating a bicycle rear derailleur or a bicycle front derailleur via a cable.

BACKGROUND ART

In a bicycle which comprises a multiple rear gear having a plurality of diametrically different sprockets arranged in side by side relation (such a multiple rear gear being referred to as a multiple freewheel) as well as a multiple front gear having a plurality of diametrically different sprockets arranged in side by side relation (such a multiple front gear being referred to as a multiple chainwheel), a speed change may be performed shifting the chain to a selected sprocket of each multiple gear.

A device for shifting a chain to a selected sprocket of a multiple freewheel is called a rear derailleur, whereas a device for shifting a chain to a selected sprocket of a multiple chainwheel is called a front derailleur. In general, these derailleurs are designed to laterally press, in running, the endless chain between the multiple freewheel and the multiple chainwheel at a portion entering the multiple freewheel or the multiple chainwheel for shifting the chain to a target sprocket.

The element used for pressing a portion of the chain in this way is generally called a chain guide. The chain guide of the rear derailleur comprises an upper guide pulley and a lower guide tension pulley, whereas the chain guide of the front derailleur comprises a pair of guide plates arranged on both sides of the chain to sandwich it.

In general, the derailleur incorporates a parallelogram pantograph mechanism which is deformable for translating the chain guide. The parallelogram pantograph mechanism is always urged by a spring to return the chain guide toward a smaller sprocket.

A speed change operation of the derailleur, i.e., operation of deforming the parallelogram pantograph mechanism for laterally translating the chain guide, is performed via a cable by means of a speed change operation device mounted on the bicycle frame or handlebar. Most typically, the speed change operation device is in the form of an operation lever, and a control cable with its one end connected to the derailleur has its other end connected to the operation lever. Pivotal movement of the operation lever in one direction causes the control cable to be pulled, whereas pivotal movement of the operation lever in the opposite direction causes the control cable to be paid out. When the control cable is pulled, the pantograph mechanism is deformed against the spring force by as much as the cable is pulled. When the control cable is paid out, the pantograph mechanism is deformed under the restoring force of the spring by as much as the cable is paid out.

A speed change by the derailleur, i.e., a chain shift to a target sprocket of the multiple gear, occurs only when the chain guide moves to a lateral position corresponding to the target sprocket. Referring to FIG. 8, for example, when shifting the chain from the smallest sprocket S1 to intermediate sprocket S2 of a triple sprocket chainwheel CW, the chain guide need be moved from the position X1 corresponding to the smallest sprocket S1 to the position X2 corresponding to the intermediate sprocket S2. When shifting the chain to the largest sprocket S3, the chain guide need be moved to the position X3 corresponding to the largest sprocket S3.

In this way, for a chain shift by the derailleur, the chain need be brought to a limited range of positions for suitably shifting the chain to the target sprocket. Therefore, for enabling anyone to easily perform an appropriate speed change operation, a speed change operation device has been proposed which incorporates a built-in positioning mechanism to clickingly hold the lever stepwise at predetermined angular intervals. With such a speed change operation device, if the lever is pivoted to each stepwise engaging position, the chain guide is automatically brought to an appropriate position corresponding to the target sprocket.

With a speed change operation lever incorporating a built-in positioning mechanism, it is common to add an overshift function for realizing a quick and reliable speed change. The overshift function is a function wherein, when shifting the chain from a currently meshing sprocket to a target larger sprocket, the chain guide is moved beyond a position corresponding to the target sprocket and then returned to the corresponding position as soon as the chain starts engaging the target sprocket. This function eliminates the factor which deteriorates the speed change response due to the fact that the chain guide presses the chain at a position spaced from the outer periphery of the sprocket in shifting the chain, thereby providing an improved speed change performance.

A speed change operation lever which incorporates an overshift type built-in positioning mechanism is disclosed in Japanese Patent Application Laid-open No. 63-269795 for example and has the following structure.

Specifically, the operation lever has a basic structure wherein a ball held at a fixed position relative to a lever shaft is pressed against a positioning plate which is co-rotatable with a lever body, and wherein the positioning plate and the lever body are loosely movable about the lever shaft relative to each other. The positioning plate is provided with a plurality of engaging holes arranged at predetermined angular intervals in corresponding relation to the speed steps, and the ball successively comes into elastic positioning engagement with the engaging holes when the positioning plate rotates with the lever body.

With the arrangement described above, when the lever body is rotated in the cable winding direction, the positioning plate also rotates with the lever body to bring the ball into positioning engagement with one of the engaging holes of the positioning plate. Upon liberation of the lever body after the positioning operation, the lever body is reversely rotated in the cable pay-out direction by an angle corresponding to the play relative to the positioning plate because the lever body is always urged in the cable pay-out direction by the return spring of the derailleur. In this way, an overshift operation is performed wherein the chain guide of the derailleur is first moved in excess of a position corresponding to the target sprocket and thereafter returned to the corresponding position.

According to the above-described prior art, the overshift is determined by the play of the lever body relative to the positioning plate. Therefore, the amount of overshift is always constant regardless of the speed steps.

Referring to FIG. 8, when performing a speed change with respect to the three-speed chainwheel CW, different amounts of overshift should ideally be provided for the case of shifting the chain from the smallest sprocket S1 to the intermediate sprocket S2 and for the case of shifting the chain from the intermediate sprocket S2 to the largest sprocket S3. More specifically, an overshift (X2–X2') for shifting the chain from the smallest sprocket S1 to the intermediate sprocket S2 should be set greater than an overshift (X3–X3') for shifting the chain from the intermediate sprocket S2 to the largest sprocket S3. This is because, as a general tendency, a chain guide pressing position (L2) for shifting the chain from the smallest sprocket S1 to the intermediate sprocket S2 is located farther from the outer circumference of the relevant sprocket than a chain guide pressing position (L3) for shifting the chain from the intermediate sprocket S2 to the largest sprocket S3 (L2>L3), so that the chain need be deflected to a greater extent for realizing a quick chain shift.

In the example of FIG. 8, if the overshift is set at an amount required for suitably shifting the chain from the smallest sprocket S1 to the intermediate sprocket S2, such an overshift is too large for shifting the chain from the intermediate sprocket S2 to the largest sprocket S3, so that the chain will tend to fall beyond the largest sprocket. To avoid such a problem, it will be necessary to take some measure, such as the provision of a guide ring, for preventing the chain from falling, which results in an increase in the number of components and a weight increase.

On the other hand, if the overshift is set at an amount required for suitably shifting the chain from the intermediate sprocket to the largest sprocket, such an overshift is insufficient for shifting the chain from the smallest sprocket to the intermediate sprocket, which results in poor speed change performance.

If the overshift is constant, similar problems will also occur with respect to such a freewheel as shown in FIG. 13. Specifically, a smaller sprocket chain guide position (L2 for example) is usually located farther from the relevant sprocket than a larger sprocket chain guide position (L5 for example), a larger overshift should be provided for a chain shift at a smaller sprocket position than for a chain shift at a larger sprocket position. However, since the prior art device provides only a constant overshift, it is difficult to provide a quick speed change for both of smaller and larger sprockets.

The present invention, which has been conceived under the above-described circumstances, aims to provide a bicycle speed change operation device incorporating a built-in stepwise positioning mechanism which is capable of setting an appropriate overshift for every speed step.

DISCLOSURE OF THE INVENTION

According to a first aspect of the present invention, there is provided a bicycle speed change operation device comprising: a support member; an operation member supported for rotation about an axis of the support member, the operation member being operated to pull and pay out one end of a cable; an engaging member provided on one of the support member and the operation member; and a positioning member provided on the other of the support member and the operation member, the positioning member having plural engaging portions; the engaging member successively coming into elastic positioning engagement with the plural engaging portions upon rotation of the operation member;

wherein the positioning member is divided into plural parts, the plural engaging portions being divided into plural groups each carried by a divided part of the positioning member, the plural parts of the positioning member including a first part which is loosely movable about an axis of the support member within a predetermined angle relative to the member on which the positioning member is provided, the plural parts of the positioning member including a second part which is loosely movable circumferentially of the support member within a predetermined angle relative to the first part.

According to a second aspect of the present invention, there is provided a bicycle speed change operation device comprising: a support member; an operation member supported for rotation about an axis of the support member, the operation member being operated to pull and pay out one end of a cable; an engaging member provided on one of the support member and the operation member; and a positioning member provided on the other of the support member and the operation member, the positioning member having plural engaging portions; the engaging member successively coming into elastic positioning engagement with the plural engaging portions upon rotation of the operation member;

wherein the positioning member is divided into plural parts, the plural engaging portions being divided into plural groups each carried by a divided part of the positioning member, the plural parts of the positioning member including a first part which is loosely movable circumferentially of the support member within a predetermined angle relative to the member on which the positioning member is provided, the plural parts of the positioning member including a second part which is loosely movable about an axis of the support member within a different angle than the first part relative to the member on which the positioning member is provided.

With the bicycle speed change operation device according to the first aspect of the present invention, the positioning member associated with one of the support member and the operation member as well as the engaging member associated with the other of the support member and the operation member rotates about the axis of the support member, thereby causing the engaging member to successively come into elastic positioning engagement with the plural engaging portions upon rotation of the operation member. The first part of the positioning member is loosely movable within a predetermined angle relative to the member with which the positioning member is associated, thereby providing a basic overshift for the speed steps which correspond to those of the engaging portions assigned to the first member. The second part of the positioning member is loosely movable within a predetermined angle relative to the first member to provide an additional overshift for the speed steps which correspond to those of the engaging portions assigned to the second member, the additional overshift being combined with the basic overshift to provide a larger overshift.

In this way, a desired overshift may be set for every speed step. It is now assumed that the speed change operation device is designed for shifting a chain with respect to a chainwheel which has three sprockets including a smallest sprocket, an intermediate sprocket and a largest sprocket. In this case, the positioning member may be divided for example into two parts which include a first part and a second part. The first part carries an engaging portion which corresponds to the largest sprocket, whereas the second part carries another engaging portion which corresponds to the intermediate sprocket. As a result, a chain shift to the intermediate sprocket can be performed with a larger overshift than a chain shift to the largest sprocket, thereby making it possible to set an appropriate overshift for every speed step for solving the problems of the prior art.

According to a preferred embodiment, the positioning member is associated with a lever shaft or a handlebar as the support member, whereas the engaging member is associated with the operation member. Conversely, however, the positioning member may be associated with the operation member, whereas the engaging member may be associated with the lever shaft or the handlebar as the support member. An important point resides in that the positioning member and the engaging member move relative to each other about the lever shaft for bringing the engaging member into successive positioning engagement with the engaging portions when the operation member is rotationally operated.

According to a preferred embodiment, the engaging member comprises two balls retained by respective retaining holes of two retainer plates each of which is rotatable relative to the lever shaft as the support member but non-rotatable relative to the operation member, whereas the first part of the positioning member is fitted on the lever shaft for relative rotation within a predetermined angle. The positioning member comprises a plate interposed between the retainer plates, and the engaging portions comprise through-holes formed in the plate-form positioning member. Further, the balls are urged by a generally U-shaped leaf spring toward the plate-form positioning member held between the two retainer plates, the spring being fitted on the two retainer plates to sandwich the two retainer plates on both sides. Moreover, a laminate of the two retainer plates and the intervening plate-form positioning member is compressively retained by a spring clip.

With the arrangement described above, the elastic forces exerted on the positioning member by the two balls offset each other, so that the positioning member is not subjected to unwanted forces. It is also possible to realize a weight and size reduction by reducing the strength of the positioning member and to ensure smooth rotational operation of the operation member.

Further, the laminate of the two retainer plates and the intervening plate-form positioning member together with the two balls held in the retaining holes of the retainer plates are assembled as a cassette by the spring clip and the U-shaped leaf spring. Thus, the speed change operation device can be easily assembled by first fitting the cassette assembly onto the lever shaft and thereafter mounting the operation member.

The bicycle speed change operation device according to the second aspect of the present invention has the same basic structure as that according to the first aspect, but the divided parts of the positioning member are loosely movable by different amounts for providing different overshifts for the engaging portions assigned to the divided parts.

Therefore, the second aspect provides the same function and advantages as the first aspect.

The bicycle speed change operation device according to the present invention may be a lever type wherein the support member comprises a lever shaft mounted on a bicycle frame, whereas the operation member comprises an operation lever which includes a generally cylindrical boss portion rotatably fitted on the lever shaft, and an arm portion extending from the boss portion. Instead, the bicycle speed change operation device may be a grip type wherein the support member comprises a handlebar or a cylindrical member fitted thereon, whereas the operation member comprises an annular member which is rotated by a grip member fitted on the handlebar.

Other features and advantages of the present invention will be become apparent from the following detailed description given with reference to the accompanying drawings.

BRIEF DESCRIPTION OF THE DRAWINGS

FIG. 18b is a half-sectional view taken along lines X5—X5 in FIG. 18a;

BEST MODE FOR CARRYING OUT THE INVENTION

Figure 1:
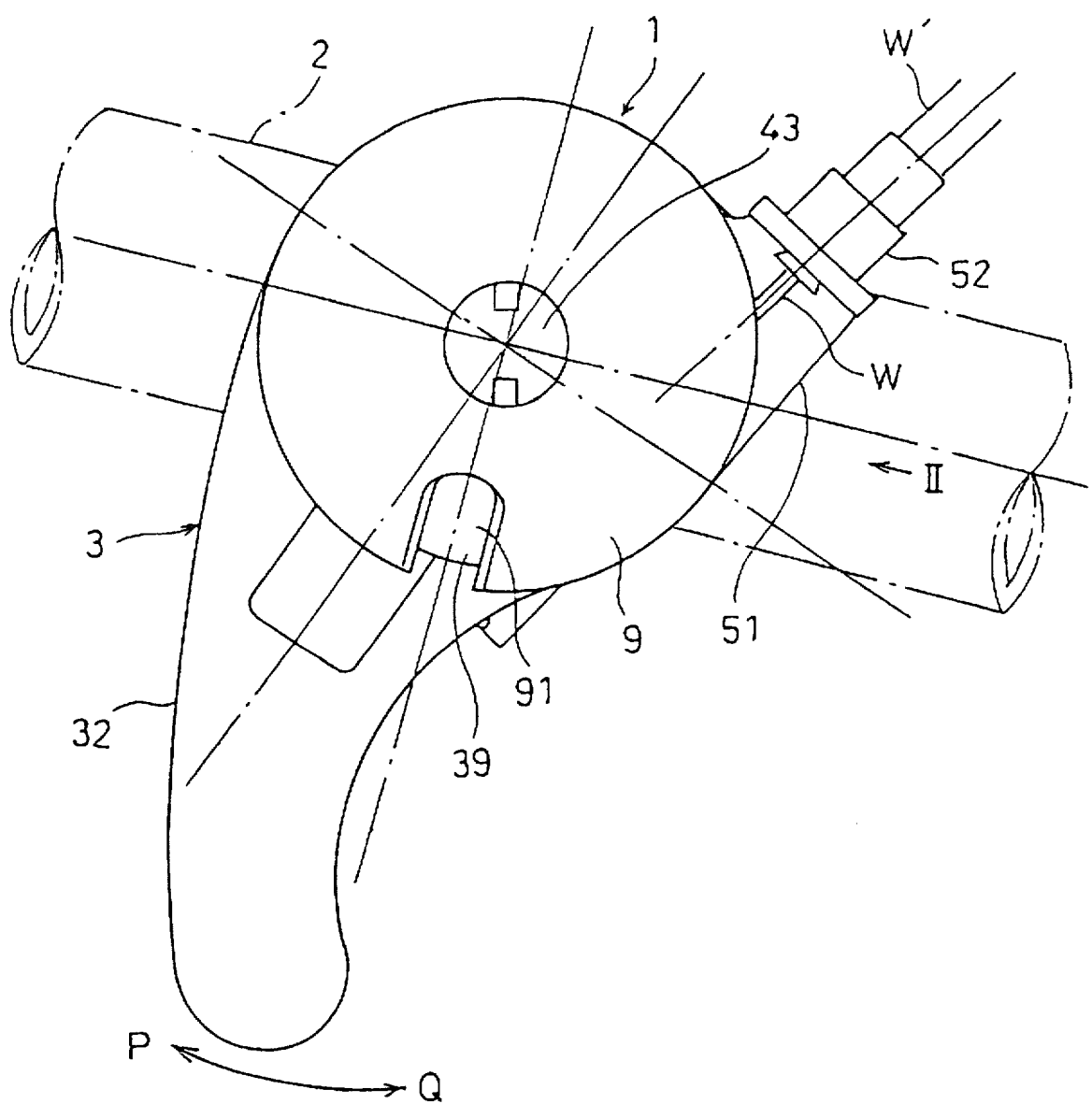
FIG. 1 is a plan view of a speed change operation device according to a first embodiment of the present invention.
Figure 2:
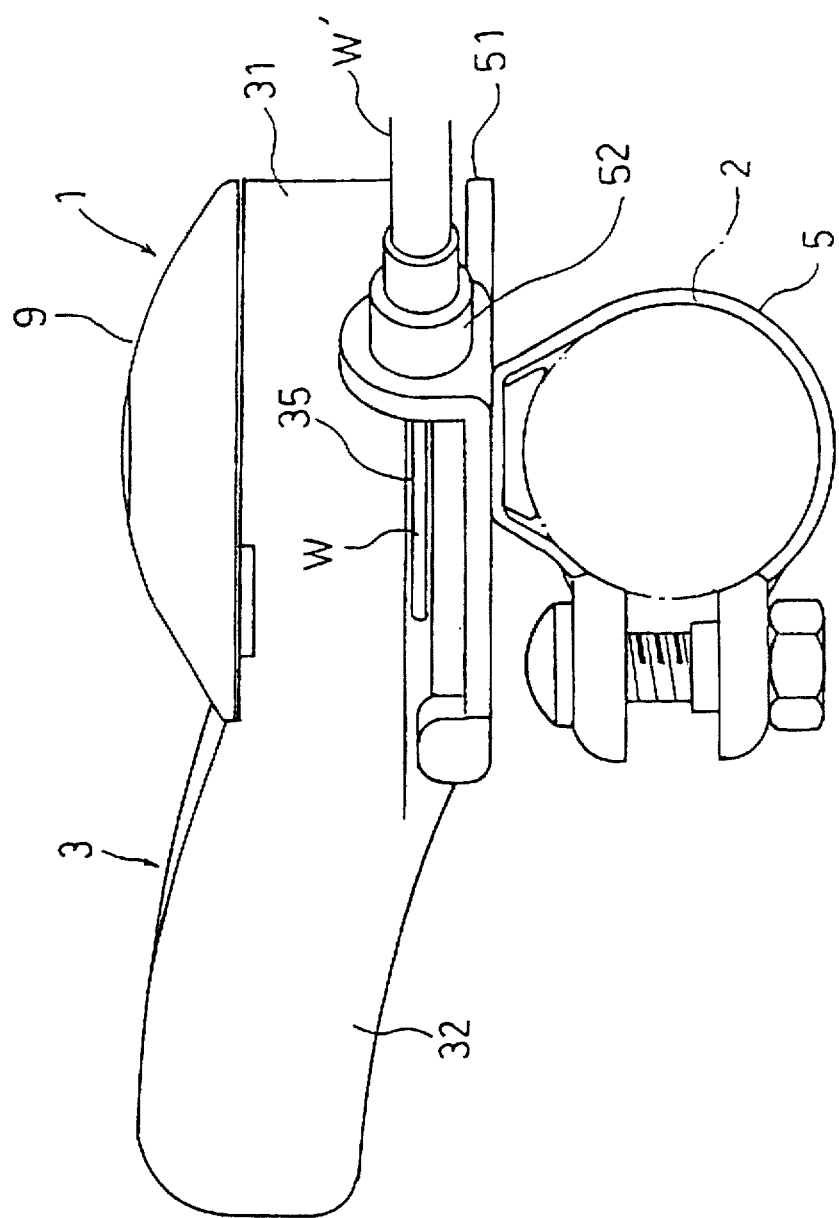
FIG. 2 is a view of the same as seen in the direction of an arrow II in FIG. 1.

FIGS. 1 through 7 show a bicycle speed change operation device 1 according to the first embodiment of the present invention. In this embodiment, the speed change operation device 1 is used to operate a front derailleur for performing a speed change. Therefore, this speed change operation device is mounted adjacent to the left grip of a handlebar 2.

As previously described, the front derailleur has the function of shifting a chain to a selected sprocket of a multiple chainwheel and is always urged to return a chain guide toward a smaller sprocket. The front derailleur is connected to one end of a cable W whose other end is connected to an operation member 3 of the speed change operation device 1. The cable is pulled up or paid out by rotating the operation member of the speed change operation device. Specifically, when the operation member 3 is rotated in a cable winding direction (arrow P direction), the cable W is pulled up against the urging force, thereby causing the chain guide to move to a larger sprocket by an amount determined by the pull. Conversely, when the operation member 3 is rotated in a cable pay-out direction (arrow Q direction), the cable W is paid-out under the urging force, thereby causing the chain guide to move to a smaller sprocket by an amount determined by the pay-out amount.

Basically, the speed change operation device 1 comprises, as the operation member, an operation lever 3 which is pivotally supported on a support lever shaft 4 mounted to the handlebar 2.

Figure 3:
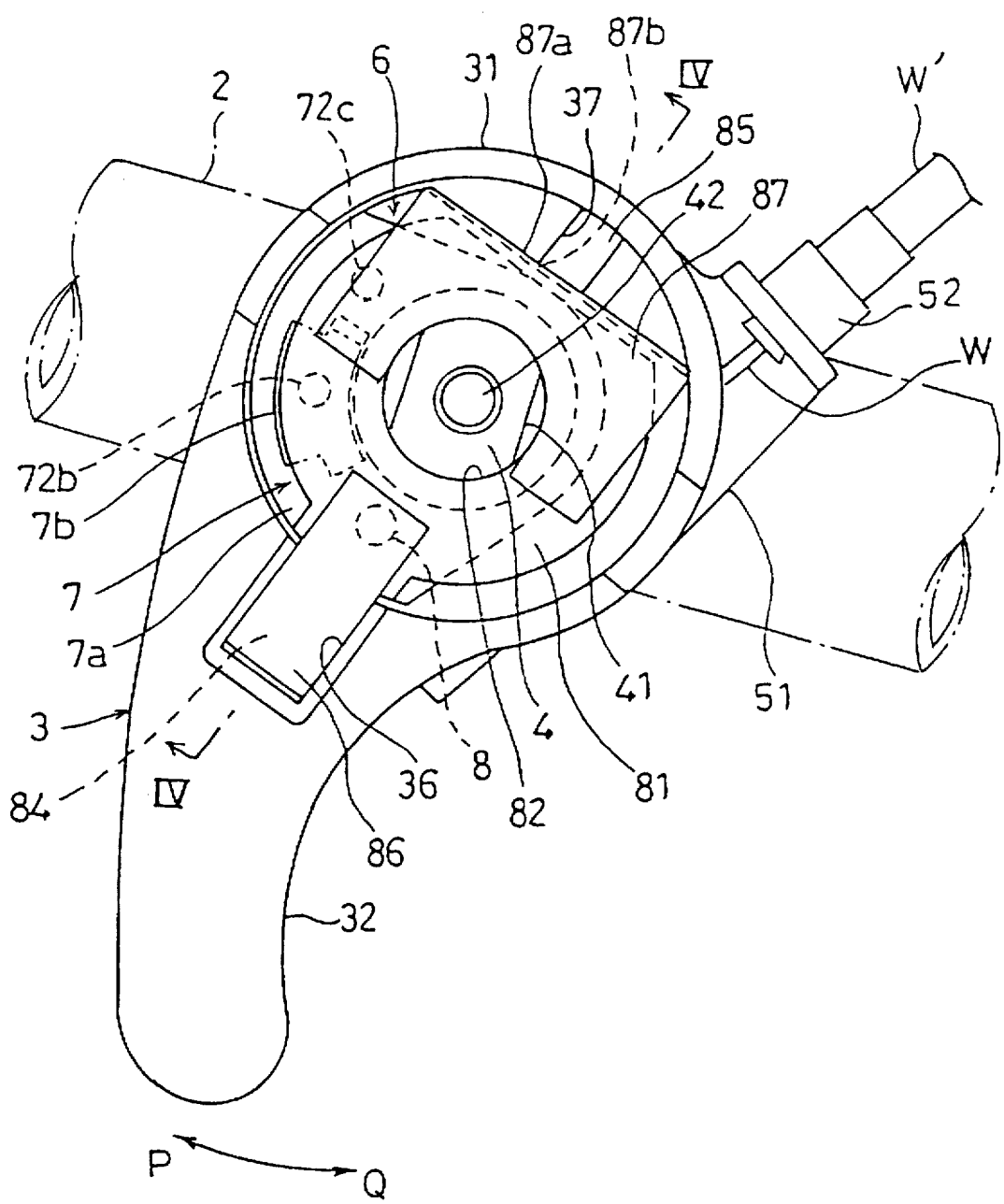
FIG. 3 is a plan view showing the exposed interior of the speed change operation device shown in FIG. 1.

As shown in FIG. 3, the lever shaft 4 projects from a lever mount 51 mounted on the handlebar 2 by means of a band 5, and includes a forward portion 41 which is outward from an axially intermediate position and has a non-circular or generally ellipsoidal cross section. The lever shaft has an axial end face formed with a threaded bore 42. The lever mount 51 is formed with an outer catcher 52 for fixedly holding an outer sheath W' in which the cable W is inserted.

Figure 4:
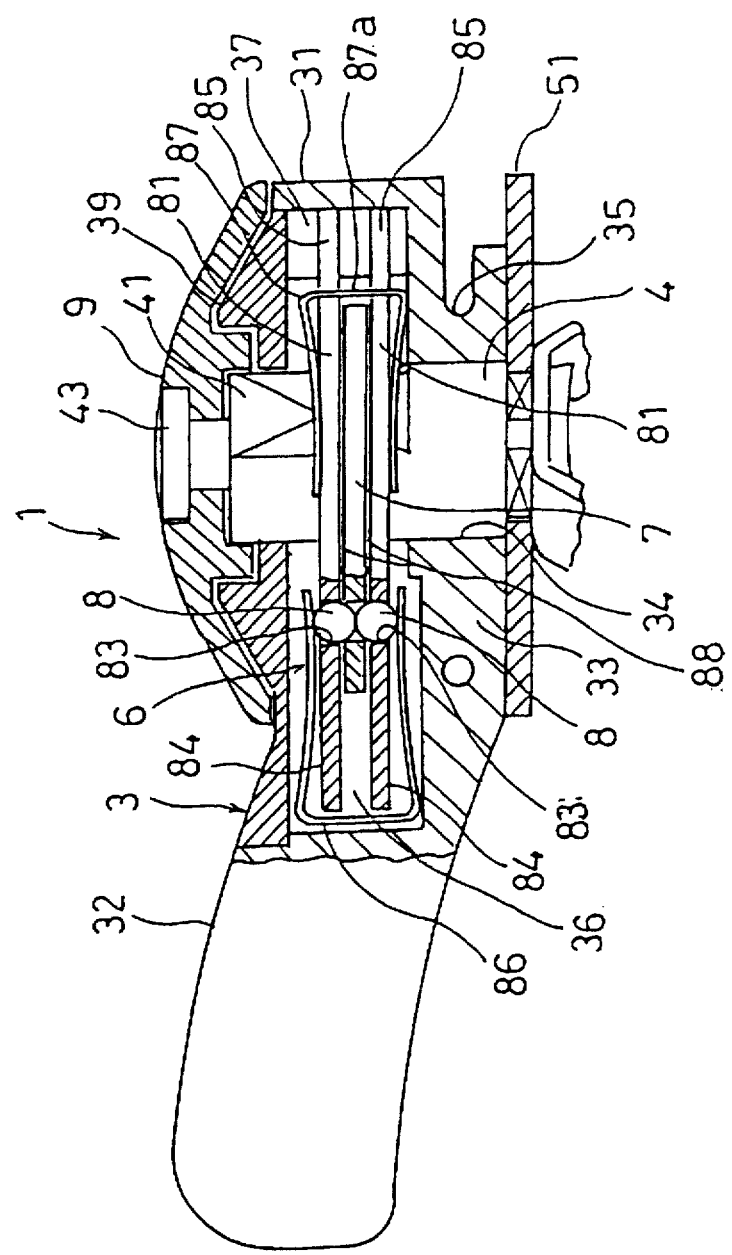
FIG. 4 is a sectional view taken on lines IV—IV in FIG. 3.

The operation lever 3 has a boss portion 31 and a finger engaging arm 32 extending therefrom. The boss portion 31 is in the form of a bottomed cylinder. As shown in FIG. 4, the bottom wall 33 of the boss portion is formed with a support bore 34 for receiving the lever shaft 4. Further, the bottom wall 33 has an outer circumference formed with a cable winding groove 35. The cable W extending out from the outer sheath W' is wound along the cable winding groove 35 and has an end nipple for engagement with the arm portion 32, thereby establishing connection to the operation lever 3.

The boss portion 31 of the operation lever 3 has an interior space which accommodates a positioning mechanism 6. The positioning mechanism 6 includes a positioning member 7 associated with the lever shaft 4, and engaging members 8 associated with the operation lever 3.

Figure 5:
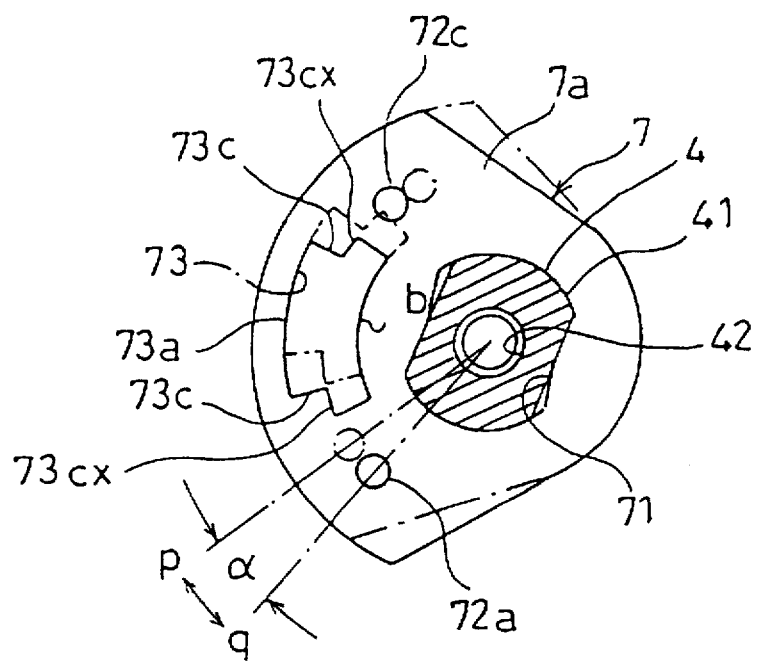
FIG. 5 is a view illustrating a first part of a positioning member.
Figure 7:
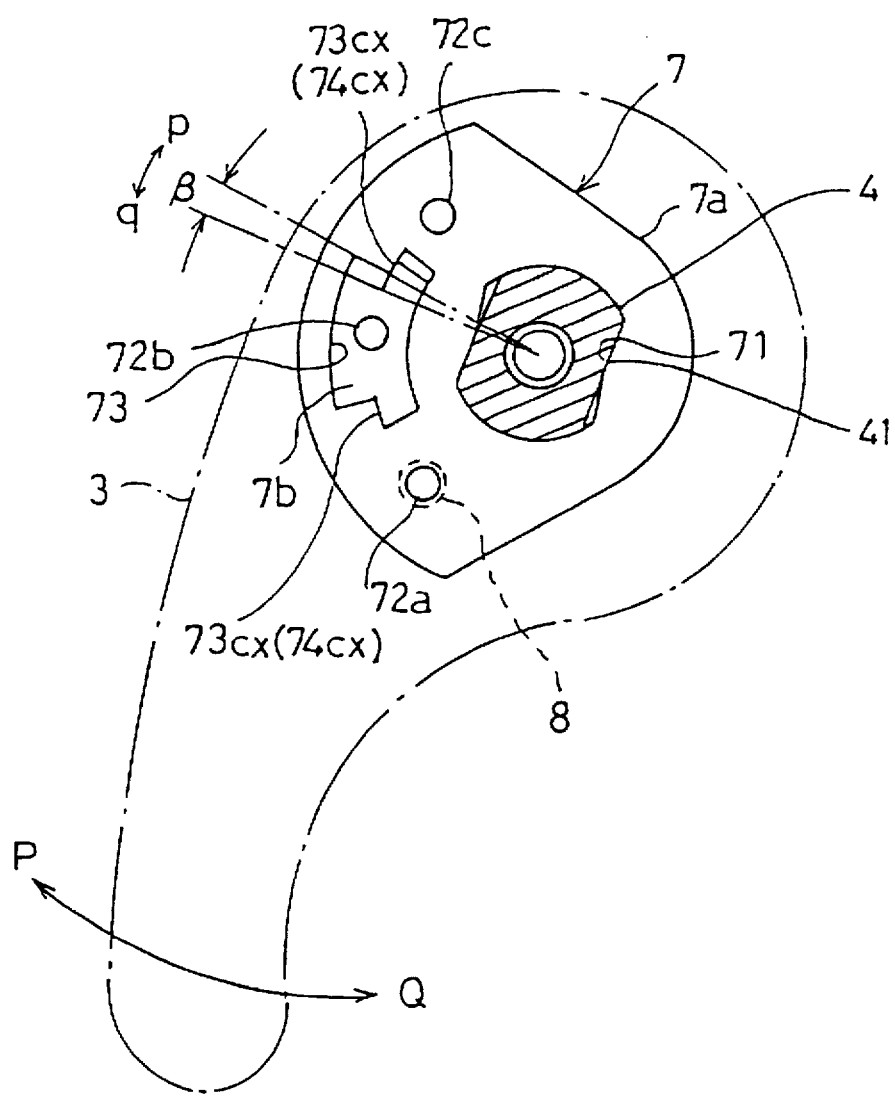
FIG. 7 is a view illustrating the operation of the speed change operation device of the first embodiment.

According to the present embodiment, the positioning member 7 is a plate member which has a fitting bore 71 for fitting on the ellipsoidal cross-sectional portion 41 of the lever shaft 4 for cooperation therewith, as shown in FIGS. 5 and 7. The fitting bore 71 has a general shape of an hourglass so as to be loosely movable relative to the lever shaft 4 within a predetermined angular range α when fitted thereon, as specifically shown in FIG. 5. The positioning member 7 is formed with a plurality of engaging holes 72a, 72b, 72c to be described hereinafter.

As shown in FIG. 4, the engaging members 8 comprise two balls 8 held in retaining holes 82 of two retainer plates 81 which flank the positioning member 7. Each of the retainer plates 81, 81 has a central hole 83 and engaging projections 84, 85. The central bore 83 is non-rotatably fitted on the lever shaft 4, whereas the engaging projections 84, 85 are associated with the operation lever 3 by engagement with engaging recesses 36, 37 of the operation lever. Thus, the engaging members (balls 8) rotate with the operation lever 3.

The two balls 8 are elastically urged toward the surfaces of the positioning member 7 by a leaf spring 86 which is roughly bent into a U-shape and fitted over the laminate of the retainer plates 81 and positioning member 7. In this way, the respective urging forces for the two balls 8 offset each other, so an unexpected force will not act on the positioning member. When assembled, the leaf spring 86 together with the engaging projections 84 of the respective retainer plates 81 is accommodated in the engaging recess 36 of the operation lever, so that the leaf spring 86 is prevented from moving relative to the retainer plates 81.

Further, the laminate of the retainer plates 81 and positioning member 7 is elastically clamped by a spring clip 87 for integration. Slide washers 88 are interposed between the positioning member 7 and the respective retainer plates 81. Thus, due to the elastic clamping force of the spring clip 87, the retainer plates 81 rotate relative to the positioning member 7 under a frictional resistance. The spring clip 87 has a web portion 87a formed with through-holes 87b, and the engaging projections 85 of the retainer plates 81 are inserted into the through-holes 87b, so that the spring clip 87 in assembly will not unexpectedly move relative to the laminate.

The U-shaped leaf spring 86 and the spring clip 87 have the function of integrating, like a cassette, the laminate of the retainer plates 81 and intervening positioning member 7 as well as the balls 8 in the retaining holes 83 of the respective retainer plates 81. Therefore, when assembling the speed change operation device 1, the above-mentioned cassette may be conveniently mounted in the boss portion 31 of the operation lever 3, thereby facilitating the assembling process. Further, it is also possible to facilitate parts control by storing the retainer plates 81, the positioning member 7, the U-shaped leaf spring 86, the spring clip 87 and the balls 8 in the cassette state.

Figure 6:
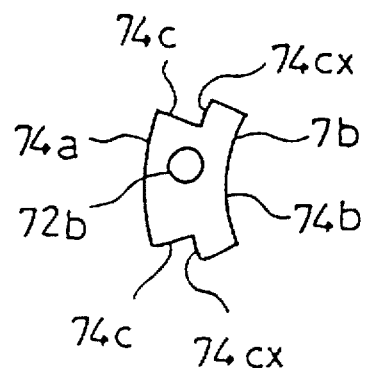
FIG. 6 is a view illustrating a second part of the positioning member.

As shown in FIGS. 5 and 6, the plate-like positioning member 7 has a two-divisional structure which includes a first part 7a with the hourglass-shaped fitting bore 71, and a second part 7b loosely held in a retaining cutout 73 of the first part 7a.

Figure 8:
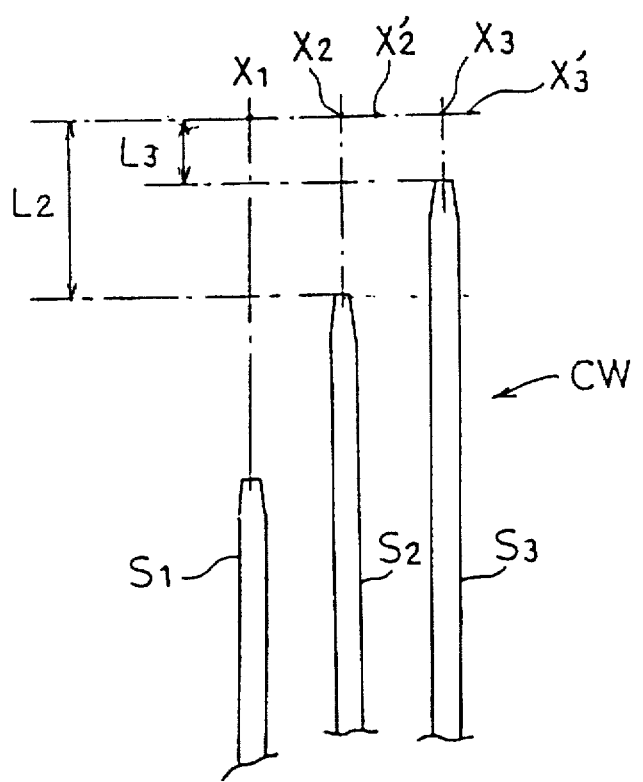
FIG. 8 is a view illustrating the operation of the speed change operation device of the first embodiment.

As shown in FIG. 5, the first part 7a has a first speed engaging hole 72a corresponding to the smallest sprocket S1 of the triple chainwheel CW shown in FIG. 8, and a third speed engaging hole 72c corresponding to the largest sprocket S3. These two engaging holes are located at the same radial position from the lever shaft 4 and spaced from each other by a predetermined angle. The retaining cutout 73 is formed between the first speed engaging hole 72a and the third speed engaging hole 72c. The retaining cutout 73a has an inwardly directed outer arcuate edge 73a extending over a predetermined angle, an inwardly directed inner arcuate edge 73b extending over a larger angle, and inwardly directed crank edges 73c connecting the circumferential ends of these arcuate edges. Each of the crank edges 73c has a circumferentially extending portion 73cx which is spaced from the lever shaft 4 by the same radial distance as the respective engaging holes 72a, 72c.

On the other hand, as shown in FIG. 6, the second part 7b loosely fitted in the retaining cutout 73 has an outwardly directed outer arcuate edge 74a, an outwardly directed inner arcuate edge 74b extending over a larger angle than the outwardly directed outer arcuate edge, and outwardly directed crank edges 74c connecting the circumferential ends of these outwardly directed arcuate edges. The second part has a second speed engaging hole 72b which is located at the same radial position as the first speed engaging hole 72a and the third speed engaging hole 72c and corresponds to the intermediate sprocket S2.

The angles of the outwardly directed outer arcuate edge 74a and outwardly directed inner arcuate edge 74b of the second part 7b are set smaller than those of the inwardly directed outer arcuate edge 73a and inwardly directed inner arcuate edge 73b, respectively, of the first part 7a. Each of the outwardly directed crank edges 74c has a circumferentially extending portion 74cx which is located at the same radial position as the circumferentially extending portion 73cx of each inwardly directed crank edge 73c of the retaining cutout 73.

Thus, as shown in FIG. 7, the second part 7b is movable relative to the first part 7a within a predetermined angle β circumferentially about the lever shaft while being retained in the retaining cutout 73. As can be understood from the above description, the relative movable angle β corresponds to the angular difference between the inwardly directed outer arcuate edge 73a of the retaining cutout 73 and the outwardly directed outer arcuate edge 74a of the second part 7b. Further, the circumferentially extending portions 73cx of the inwardly directed crank edges 73c of the retaining cutout 73 come into contact with the circumferentially extending portions 74cx of the outwardly directed crank edges 74c of the second part 7b at the same radial position.

As is apparent from FIG. 4, the opening at the boss portion 31 of the operation lever 3 is closed by a lid member 39. Further, the lid member 39 is covered by a cover member 9 which is mounted to the lever shaft 4 by driving a screw 44 into a threaded end bore 42 of the lever shaft. As shown in FIG. 1, the lid member 39 is provided with speed indicating numerals at suitable surface portions, whereas the cover member 9 is suitably formed with a window cutout 91 for uncovering one of the numerals.

The speed change operation device of the first embodiment having the above structure operates in the following manner.

Referring to FIGS. 5 and 7, it is now assumed that the balls 8 engage the first speed engaging hole 72a. At this time, the chain guide of the front derailleur takes the position X1 (FIG. 8) corresponding to the smallest sprocket S1 of the front chainwheel CW. Since the cable W is subjected to the elastic returning force of the front derailleur, the first part 7a of the positioning member 7 is brought to one end (arrow q direction side) of the play movement range α relative to the lever shaft 4 (FIG. 5).

Then, the operation lever 3 is pivoted in the cable winding direction, i.e., in the arrow P direction. Since the balls 8 are associated with the operation lever 3, the first part 7a of the positioning member 7 pivots with the operation lever up to the other end (arrow p direction side) of the play movement range α (phantom lines in FIG. 5) while the first speed engaging hole 72a is held in engagement with the balls 8. When the operation lever 3 is pivoted further in the arrow P direction, the balls 8 disengage from the first speed engaging hole 72a and slide on the first part 7a in the arrow P direction, because the first part 7a can no longer pivot in the arrow p direction. The balls 8 then slide along the circumferentially extending portion 73cx of the inwardly directed crank edge 73c of the retaining cutout 73 of the first part 7a (the circumferentially extending portion 74cx of the outwardly directed crank edge 74c of the second part 7b) and move onto the second part 7b. The balls 8 elastically clamp the second part 7b and causes it to frictionally move relative to the first part 7a in the arrow p direction over the play movement range β. Then, the balls 8 click in the second speed engaging hole 72b of the second part 7b. At this time, the chain guide of the front derailleur is moved toward the intermediate sprocket S2 with an overshift (X2–X2' in FIG. 8) corresponding to the sum (α+β) of the play movement range α of the first part 7a relative to the lever shaft 7 and the play movement range β of the second part 7b relative to the first part 7a, thereby executing a quick chain shift.

Upon subsequent liberation of the operation lever 3, while the balls 8 are held in engagement with the second speed engaging hole 72b, the operation lever 3 under the returning force of the derailleur automatically pivots reversely in the arrow Q direction by an angle corresponding to the overshift (α+β) and then stops. As a result, the chain guide of the front derailleur returns from the overshift position (X2' in FIG. 8) to the position (X2 in FIG. 8) corresponding to the intermediate sprocket S2.

When the operation lever 3 is pivoted in the arrow P direction with the balls 8 engaging the second speed engaging hole 72b of the second part, the second part 7b dragged by the movement of the balls 8 pivotally moves in the arrow P direction by an amount corresponding to the sum of the play β of the second part 7b relative to the first part 7a and the play α of the first part 7a relative to the lever shaft 7. When the operation lever 3 is pivoted further in the arrow P direction, the balls 8 disengage from the second speed engaging hole 72b and slide on the second part 7b, because the second part 7b can no longer pivot in the arrow P direction. The balls 8 then slide along the circumferentially extending portion 74cx of the outwardly directed crank edge 74c of the second part 7b (the circumferentially extending portion 73cx of the inwardly directed crank edge 73c of the retaining cutout 73 of the first part 7a) and move onto the first part 7a. The balls 8 elastically clamp the first part 7a and holds it in the arrow p direction end of the play movement range β while the balls slide in the arrow P direction. Then, the balls 8 click in the third speed engaging hole 72c of the first part 7a. At this time, the chain guide of the front derailleur is moved with an overshift (X3–X3' in FIG. 8) corresponding to the play movement range α of the first part 7a relative to the lever shaft 7, thereby executing a quick chain shift to the largest sprocket S3.

Upon subsequent liberation of the operation lever 3, while the balls 8 are held in engagement with the third speed engaging hole 72c, the operation lever 3 under the returning force of the derailleur automatically pivots reversely in the arrow Q direction by an angle (α) corresponding to the overshift and then stops. As a result, the chain guide of the front derailleur returns from the overshift position (X3' in FIG. 8) to the position (X3 in FIG. 8) corresponding to the largest sprocket S3.

As described above, the speed change operation device of the above structure is capable of providing a greater overshift (X2–X2' in FIG. 8) for shifting the chain to the intermediate sprocket S2 than an overshift (X3–X3' in FIG. 8) for shifting the chain to the largest sprocket S3. Thus, it is possible to perform a speed change with an appropriate overshift for each speed step of the front derailleur.

However, the above-described overshift does not occur when shifting the chain from the largest sprocket S3 toward the smallest sprocket. As repetitively described, since the operation lever 3 is always subjected to the returning force acting in the cable pay-out direction, namely, in the arrow Q direction, the first part 7a or second part 7b of the positioning member 7 engaging the balls 8 associated with the operation lever is positioned at the q direction end of each play movement range ($\alpha$, $\beta$) and no longer pivotable in the arrow Q direction. Therefore, if the operation lever 3 is pivoted in the arrow Q direction, the balls 8 will undergo a normal positioning operation wherein they disengage from the previously mated engaging hole for clicking engagement with an adjacent engaging hole after sliding on the positioning member 7.

Figure 13:
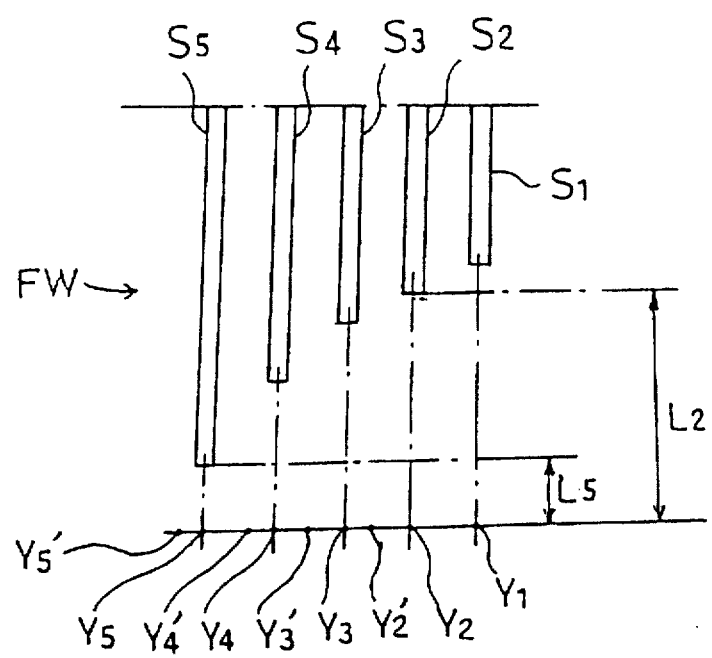
FIG. 13 is a view illustrating the operation of the speed change operation device of the second embodiment.

FIGS. 9 through 12 show a bicycle speed change operation device according to the second embodiment of the present invention. In this embodiment, a rear derailleur is operated for performing a speed change relative to a multiple freewheel FW (FIG. 13). The speed change operation device 1 is mounted adjacent to the right grip of a handlebar.

Figure 9:
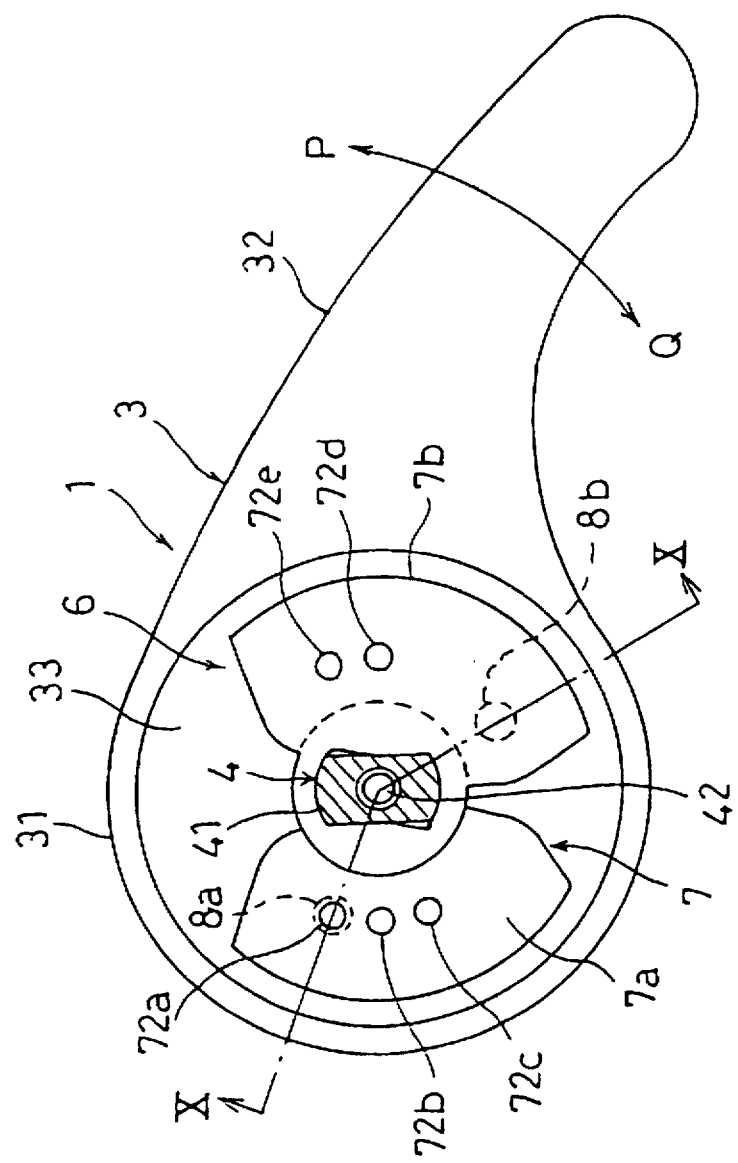
FIG. 9 is a plan view showing the exposed interior of a speed change operation device according to a second embodiment of the present invention.
Figure 10:
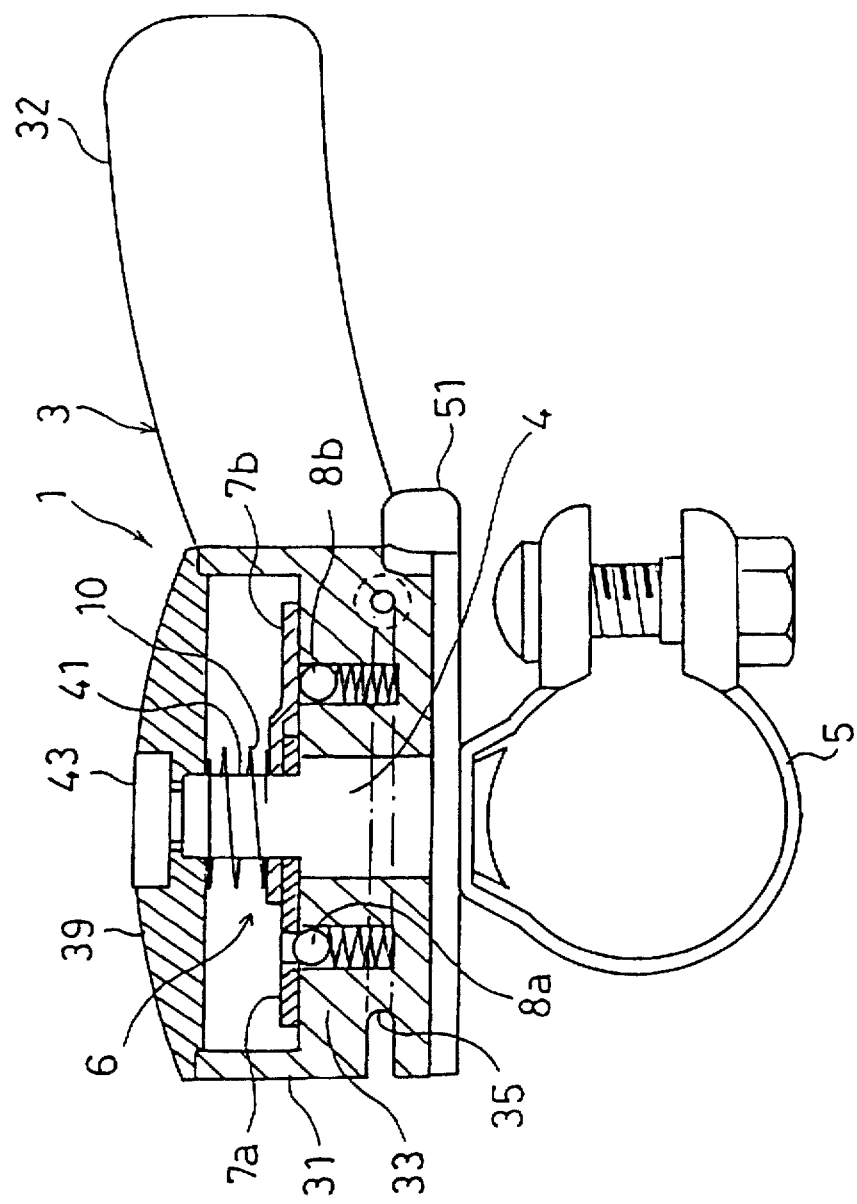
FIG. 10 is a sectional view taken on lines X—X in FIG. 9.
Figure 11:
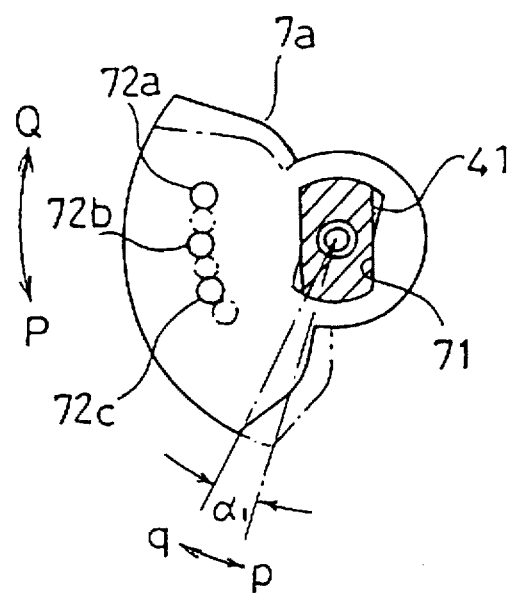
FIG. 11 is a view illustrating a first part of a positioning member.
Figure 12:
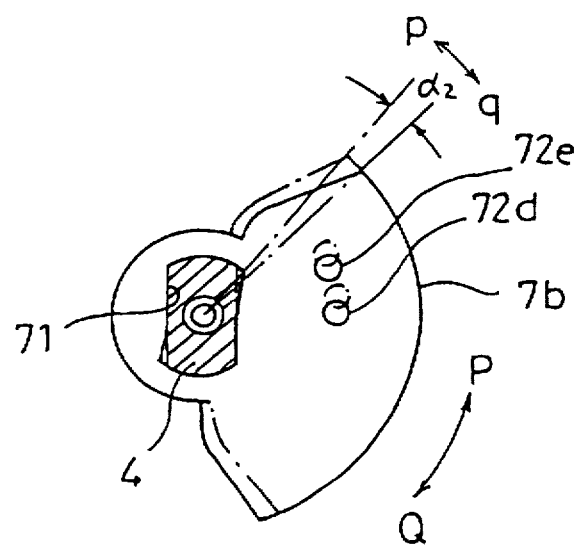
FIG. 12 is a view illustrating a second part of the positioning member.

Again, the speed change operation device 1 comprises an operation member in the form of an operation lever 3 which is pivotally supported on a support lever shaft 4 mounted to the handlebar 2. The lever shaft 4 projects from a lever mount 51 mounted on the handlebar 2 by means of a band 5, and includes an axially forward portion 41 which has a generally ellipsoidal cross section, as shown in FIG. 9. The lever shaft has an axial end face formed with a threaded bore 42.

The operation lever 3 has a bottomed cylindrical boss portion 31 and a finger engaging arm 32. The boss portion has a bottom wall 33 formed with a support bore 34 for fitting on the lever shaft 4. Further, the bottom wall 33 has an outer circumference formed with a cable winding groove 35. Similarly to the first embodiment, one end of a cable W is connected to the rear derailleur, whereas the other end of the cable is connected to the operation lever 3 through the cable winding groove 35.

The boss portion 31 of the operation lever 3 has an interior space which accommodates a positioning mechanism 6. In this embodiment, again, the positioning mechanism 6 includes a positioning member 7 associated with the lever shaft 4, and engaging members 8 associated with the operation lever 3.

The positioning member 7 includes a first part 7a and a second part 7b. Each of the first and second parts 7a, 7b has a fitting bore 71 for fitting on the ellipsoidal cross-sectional portion 41 of the lever shaft 4 for cooperation therewith. As specifically shown in FIGS. 11 and 12, the fitting bores 71 of the members 7a, 7b have a general shape of an hourglass so as to be loosely movable relative to the lever shaft 4 within predetermined angular ranges of $\alpha 1$, $\alpha 2$, respectively, when fitted thereon. The setting of the play movement ranges ($\alpha 1$, $\alpha 2$) is such that the range for the first part 7a is greater than that for the second part 7b ($\alpha 1 > \alpha 2$).

As described hereinafter, the first part 7a is a member used for positioning relative to smaller sprockets of the multiple freewheel FW (FIG. 13), whereas the second part 7b is a member used for positioning relative to larger sprockets. The first part 7a has smaller-diameter-side or first to third speed engaging holes 72a, 72b, 72c spaced from each other at predetermined angular intervals and arranged at a constant radial distance from the lever shaft. The second part 7b has larger-diameter-side or fourth and fifth speed engaging holes 72d, 72e spaced from each other at a predetermined angular interval and arranged at a constant radial distance from the lever shaft. The first and second parts 7a, 7b are urged against the bottom surface of the boss portion of the operation lever 3 by means of a compression coil spring 10 fitted on the lever shaft 4.

On the other hand, the engaging members comprise two balls 8 which are embedded in the bottom of the operation lever 3 and always urged elastically against the bottom surfaces of the respective positioning members 7a, 7b. These balls 8a, 8b are embedded at the same radial position as the respective engaging holes 72a, 72b, 72c, 72d, 72e. The first ball denoted by reference sign 8a is a ball exclusively used for the first part 7a, whereas the second ball denoted by reference sign 8b is a ball exclusively used for the second part 7b. The circumferential arrangement of these balls 8a, 8b around the lever shaft is such that as the operation lever 3 is pivoted in the cable winding direction (arrow P direction) for example, the first ball 8a alone first comes into successive engagement with the first to third speed engaging holes 72a, 72b, 72c, whereafter the second ball 8b alone comes into successive engagement with the fourth and fifth speed engaging holes 72d, 72e. The opening of the boss portion 31 of the operation lever 3 is closed by a lid member 39.

The speed change operation device 1 of the second embodiment having the above structure operates in the following manner.

FIG. 9 shows the first speed condition. Specifically, the first ball 8a engages the first speed engaging hole 72a of the first part 7a. Since the operation lever 3 is subjected to the returning force in the cable pay-out direction or arrow Q direction, the first part 7a engaging the first ball 8a associated with the operation lever 3 is brought to the arrow q direction end (FIG. 11) of its play movement range ($\alpha 1$) relative to the lever shaft 4.

In this condition, if the operation lever 3 is pivoted in the cable winding direction, i.e., in the arrow P direction, the first part 7a is dragged by the movement of the first ball 8a and loosely pivots to the p side end of the play movement range ($\alpha 1$) while the first ball 8a is held in engagement with the first speed engaging hole 72a. When the operation lever 3 is pivoted further in the arrow P direction, the first ball 8 disengages from the first speed engaging hole 72a and slides on the first part 7a before elastically coming into clicking engagement with the second speed engaging hole 72b, because the first part 7a can no longer pivot in the arrow P direction. At this time, the chain guide of the rear derailleur is moved toward the second speed sprocket S2 with an overshift (Y2–Y2' in FIG. 13) corresponding to the play movement range ($\alpha 1$) of the first part 7a, thereby executing a quick chain shift.

Upon subsequent freeing of the operation lever 3, while the first ball 8a is held in engagement with the second speed engaging hole 72b, the operation lever 3 under the returning force of the derailleur automatically pivots reversely in the arrow Q direction by an angle ($\alpha 1$) corresponding to the overshift and then stops. As a result, the chain guide of the derailleur returns from the overshift position (Y2' in FIG. 13) to the position (Y2 in FIG. 13) corresponding to the second speed sprocket S2.

In this way, a chain shift from the smallest sprocket to the second or third speed sprocket may be performed with an overshift corresponding to the play movement range of the first part 7a.

On the other hand, when shifting the chain to the fourth or fifth speed sprocket, the second ball 8b comes into positioning engagement with the fourth or fifth engaging hole 7d, 7e of the second part 7b, and an overshift occurs which corresponds to the play movement range (α2) of the second part 7b. According to the present embodiment, since the play movement range (α1) of the first part 7a is larger than the play movement range (α2) of the second part 7b, a larger overshift (Y2–Y2', Y3–Y3' in FIG. 13) is obtained in shifting the chain to the second or third speed sprocket S2, S3, whereas a smaller overshift (Y4–Y4', Y5–Y5' in FIG. 13) is obtained in shifting the chain to the fourth or fifth speed sprocket S4, S5. Thus, a speed change operation is possible with an appropriate overshift for every speed step of the multiple freewheel.

Next, description is made of a bicycle speed change operation device according to the third embodiment of the present invention. The speed change operation device according to this embodiment is a grip type bicycle speed change operation device which incorporates a special force amplifying mechanism. The speed change operation device of the third embodiment is suitable to operate a front derailleur for performing a speed change. The structure of the grip type speed change operation device with the special force magnifying mechanism will be first described with reference to FIGS. 14 through 24, and the specific structure relating to the characterizing features of the present invention will be later described with reference to FIGS. 25 through 27.

Figure 14:
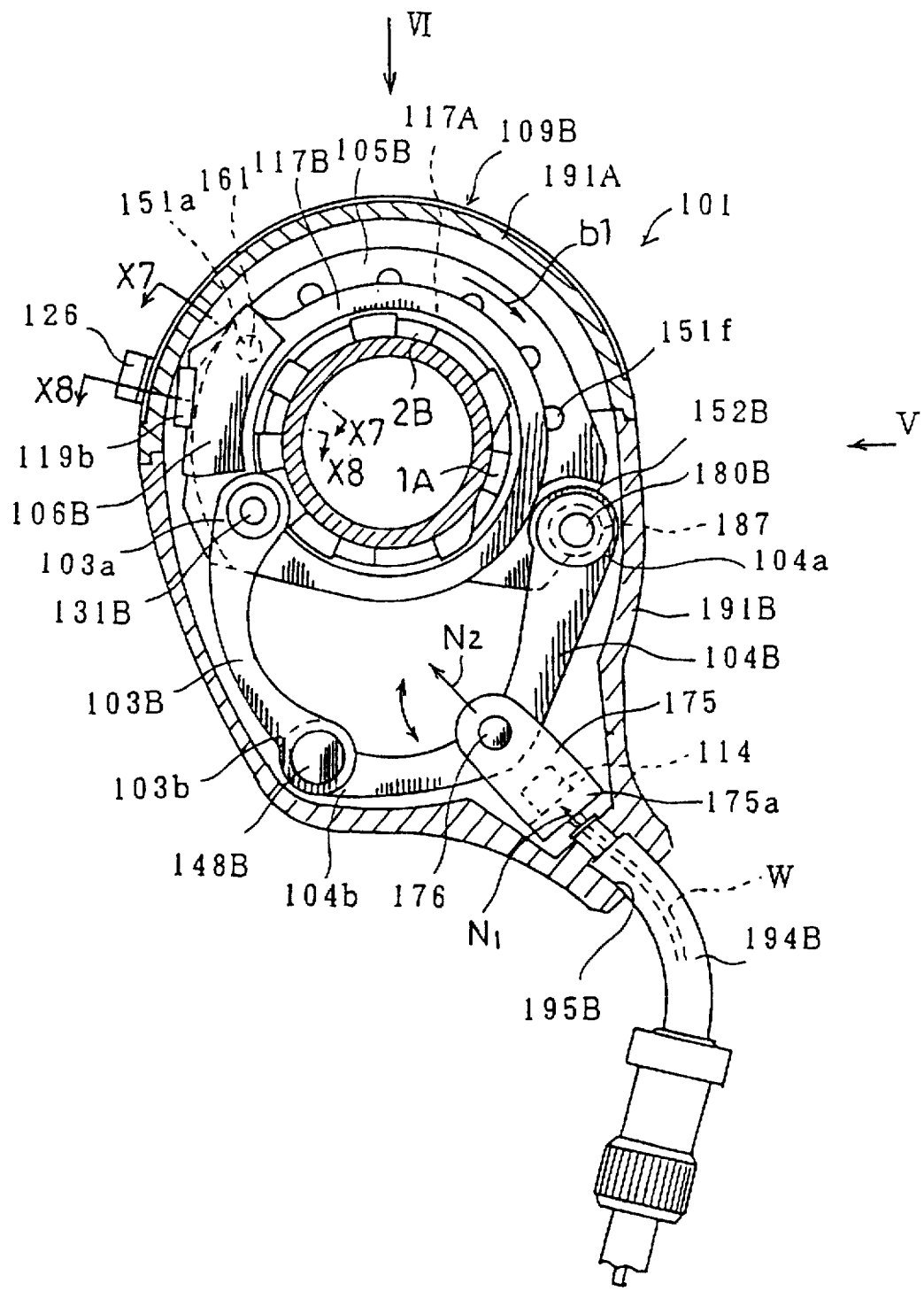
FIG. 14 is a sectional view showing a grip type bicycle speed change operation device.
Figure 15:
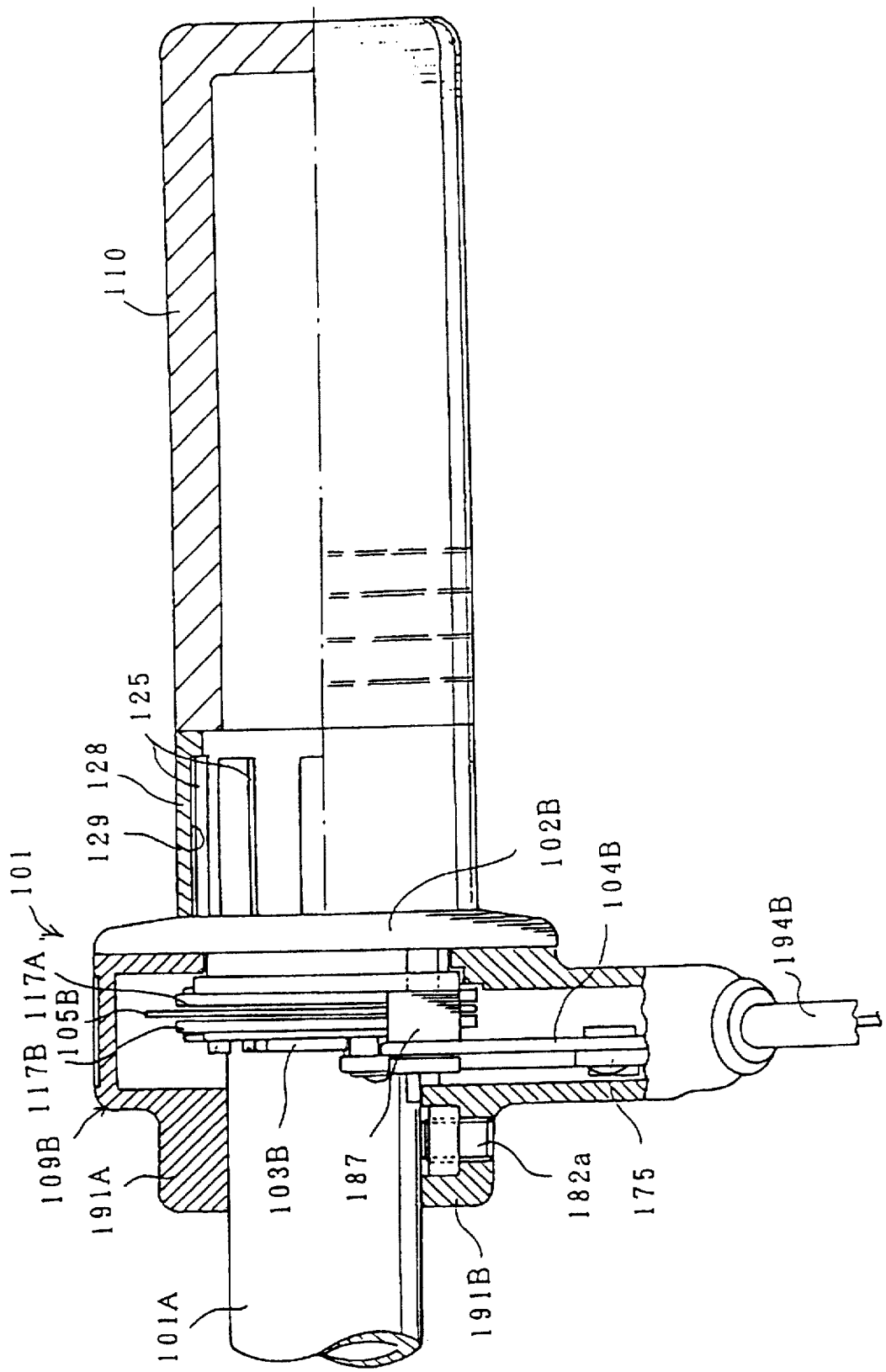
FIG. 15 is a fragmentary half-sectional view as seen in the direction of an arrow V in FIG. 14.
Figure 16:
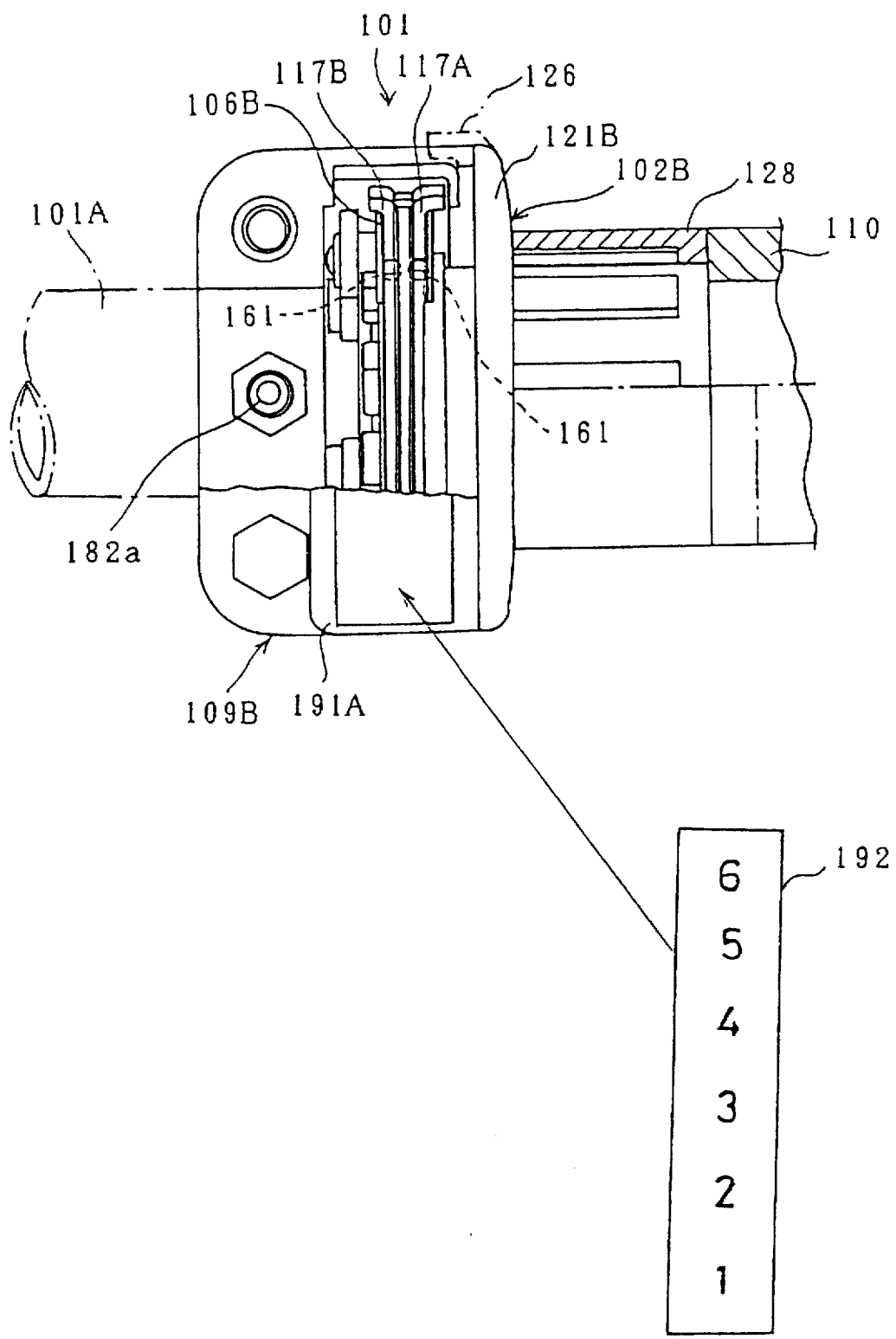
FIG. 16 is a fragmentary sectional view as seen in the direction of an arrow VI in FIG. 14.
Figure 17:
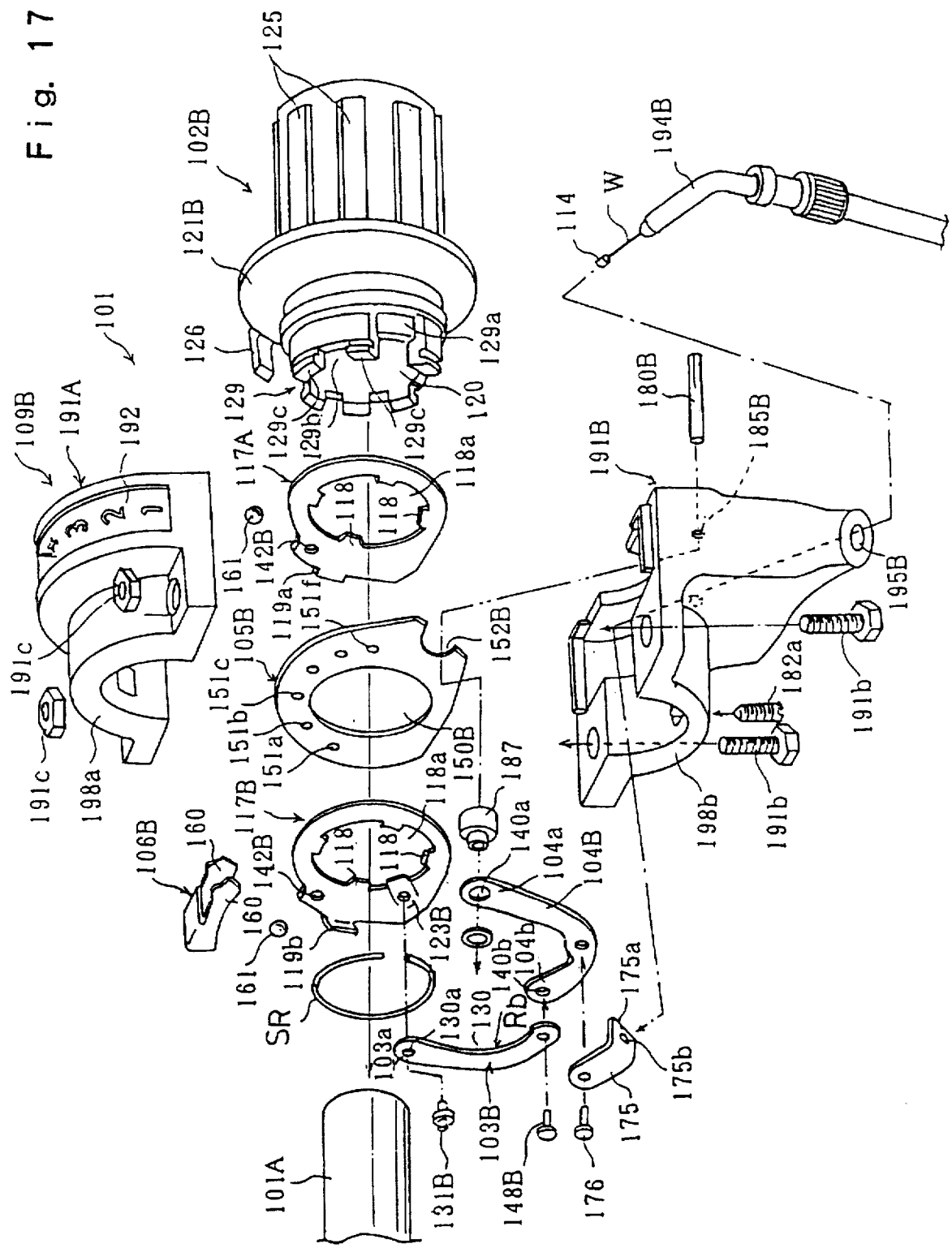
FIG. 17 is an exploded perspective view showing the bicycle speed change operation device shown in FIG. 14.

FIG. 14 is a sectional view showing the grip type bicycle speed change operation device 101. FIG. 15 is a view, partially in section, showing a principal portion of the same as seen in the arrow V in FIG. 14, whereas FIG. 16 is a partially sectional view of the same as seen in the arrow VI in FIG. 14. FIG. 17 is an exploded perspective view of the bicycle speed change operation device 101 shown in FIG. 14.

The bicycle speed change operation device 101 is used to perform a speed change by causing a rear derailleur to shift a chain relative to a multiple freewheel. Therefore, this speed change operation device is mounted adjacent to the left grip 110 which is fitted on the left end of a handlebar 101A.

As shown in FIG. 14, the bicycle speed change operation device 101 incorporates a force amplifying mechanism which comprises a combination of a first link 103B and a second link 104B for winding up or paying out a control cable W for the rear derailleur.

As shown in FIG. 17, the bicycle speed change operation device 101 includes, in addition to the first link 103B and the second link 104B, an operation member 102B rotatably fitted on the supporting handlebar 101A, two rings 117A, 117B fitted on the operation member 102B, a positioning plate 105B fitted on the operation member 102B between the two rings 117A, 117B, a spring member 106B for bringing the positioning plate 105B into engagement with the rings 117A, 117B via two balls 161 to constitute a positioning mechanism (click mechanism), a housing cover 109B constituted by an upper member 191A and a lower member 191B, and other components to be described hereinafter.

Figure 18A:
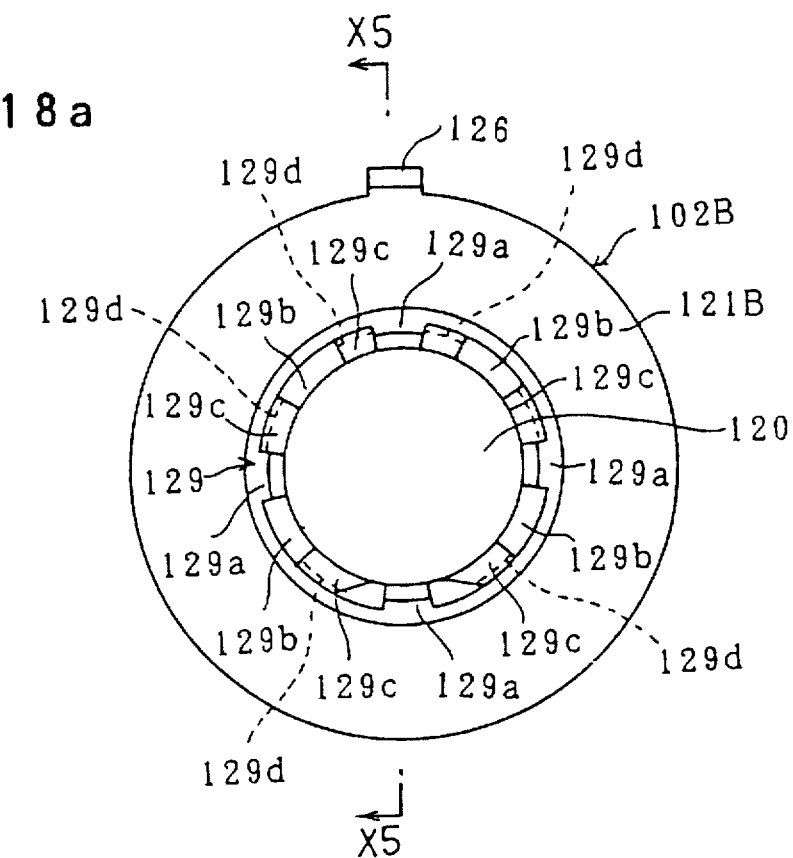
FIG. 18a is a front view showing an operation member.
Figure 18B:
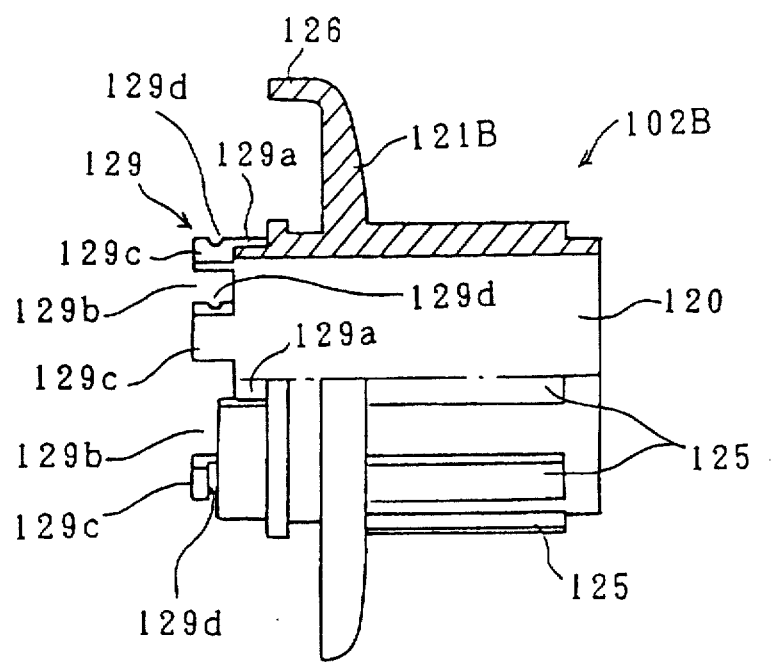

FIG. 18a is a front view of the operation member 102B, whereas FIG. 18b is a half-sectional view taken along lines X5–X5 in FIG. 18a. The operation member 102B is a cylindrical grip having a through-bore for fitting on the handlebar 101A, and has an outer peripheral surface formed with projecting strips 125 for fitting in spline grooves 129 of an operation grip 128, as shown in FIG. 15.

The operation member 102B has a flange 121B which is formed, at a circumferential portion thereof, with a projection 126. The projection 126 moves upon rotation of the operation member 102B. Specifically, when the bicycle user rotationally operates the operation grip 128 for performing a speed change, the projection 126 moves along the circumferential surface of the upper member 191A of the housing cover 109B. As shown in FIG. 16, the upper member 191A is externally attached with a label 192 which carries e.g. numerals "1" through "6" indicative of the speed steps of the rear derailleur, and the projection 126 works as an indicator for indicating the speed steps of the rear derailleur.

Further, the operation member 102B has a cylindrical front portion 129 which is circumferentially formed with a plurality of recesses 129a. A plurality of projections 129c are discontinuously provided at a tip of the cylindrical front portion 129 to form spacings 129b, and grooves 129d for a snap ring SR are formed on the outer surfaces of the projections 129c. These components serve to retain the positioning plate 105B and the rings 117A, 117B on the operation member 102B.

Figure 19A:
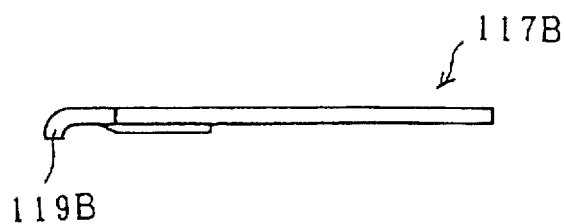
FIGS. 19a and 19b are a plan view and a front view, respectively, showing rings.
Figure 19B:
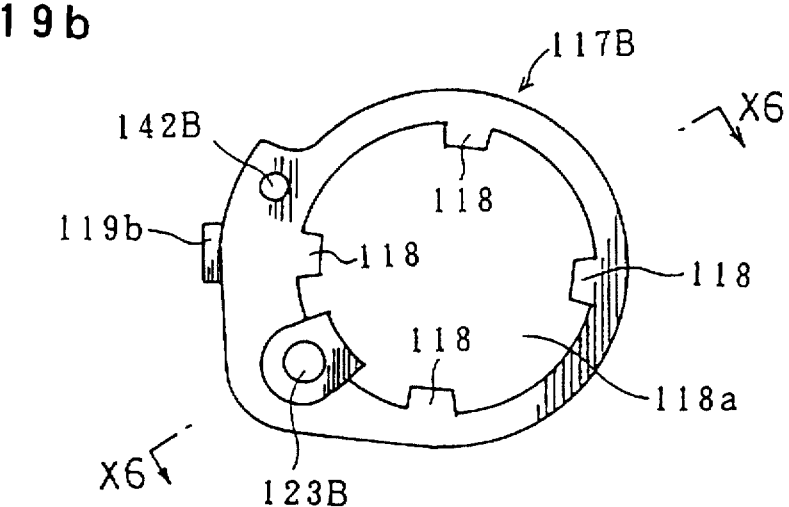
Figure 19C:
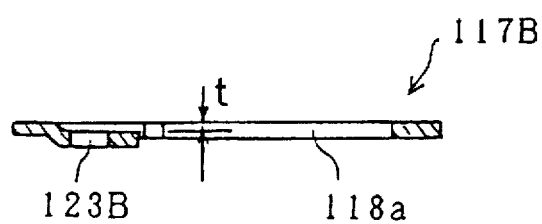
FIG. 19c is a sectional view taken along lines X6—X6 in FIG. 19b.

FIG. 19a is a plan view showing one ring 117B of the two rings 117A, 117B, whereas FIG. 19b is a front view of the same. FIG. 19c is a sectional view taken along lines X6–X6 in FIG. 19b. The ring 117B has an opening 118a for fitting on the cylindrical front portion 129 of the operation member 102B. The opening 118a has an inner circumferential surface formed with a total of e.g. four tongues 118 for fitting in the recesses 129a or the spacings 129b between the projections 129c. Therefore, the ring 117B is fitted on the operation member 102B to be non-rotatable relative thereto, but it is rotatable with the operation member 102B.

Further, the ring 117B is formed with a retaining hole 142B for receiving the ball 161 as part of the stepwise positioning mechanism, and a projection 119b for engagement with the spring member 106B, as hereinafter described. As shown in FIG. 17, the same ring is also formed with a hole 123 for connection to one end 103a of the first link 103B via a pin 131. As shown in FIG. 19c, a portion where the hole 123 is formed is pushed out relative to the nearby portion by a predetermined amount t for providing a clearance region required for crimping the tip of the pin 131B.

As shown in FIG. 17, the other ring 117A is similar in basic configuration to the ring 117B, so that a detailed description thereof is omitted. However, it should be noted that the hole 123B for connection to the first link 103B is not provided with respect to the ring 117A. Further, a projection 119a provided for the ring 117A is bent in an opposite direction, as compared with the projection 119b of the ring 117B.

Figure 20A:
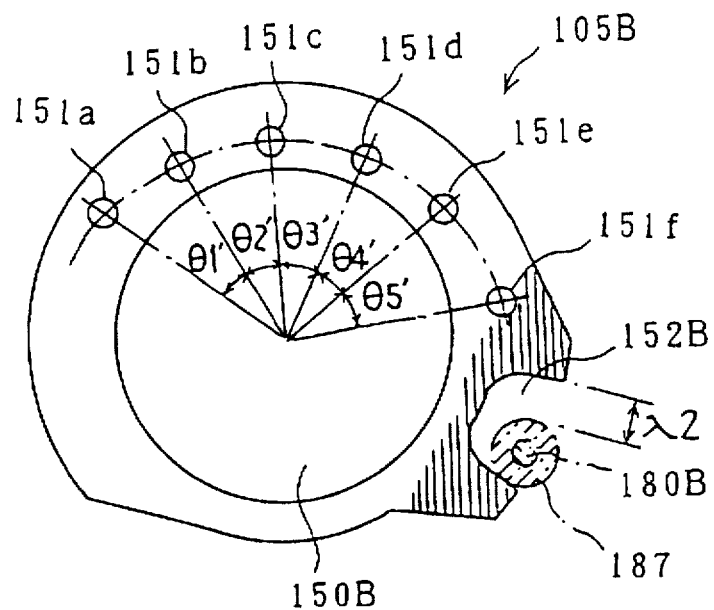
FIGS. 20a and 20b are a front view and a right side view, respectively, showing a positioning plate.
Figure 20B:
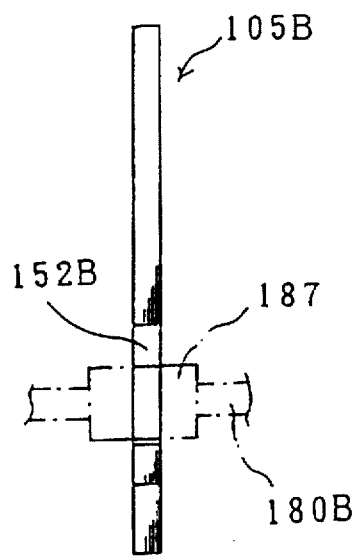

FIG. 20a is a front view of the positioning plate 105B, whereas FIG. 20b is a right side view of the same. The positioning plate 105B is an annular disk having an opening 150B for fitting on the cylindrical front portion 129 of the operation member 102B. The positioning plate 105B has a total of e.g. six engaging holes 151a–151f arranged serially in an arc of a predetermined radius R5 for engagement with the balls 161. The engaging holes 151a–151f, which are used for engagement with the balls 161 retained by the rings 117A, 117B, correspond to the respective speed steps of the multiple freewheel.

Unlike the two rings 117A, 117B, the positioning plate 105B does not come into engagement with the cylindrical front portion 129 of the operation member 102B but is fitted on the operation member 102B so as not to rotate with the operation member 102B. To the contrary, the positioning plate 105B has an outer peripheral portion formed with a cutout 152B for receiving a fixed shaft 180B fixed in the lower member 191B of the housing cover 109B together with a sleeve 187 fitted on the fixed shaft 180B, so that the positioning member 105B is restrained from rotating.

The outer diameter of the sleeve 187 is smaller than the width of the cutout 152B, so that the positioning plate 105B is slightly rotatable about the operation member 102B within a clearance range of λ2. By such an arrangement, the speed change operation device allows for an overshift.

Figure 21:
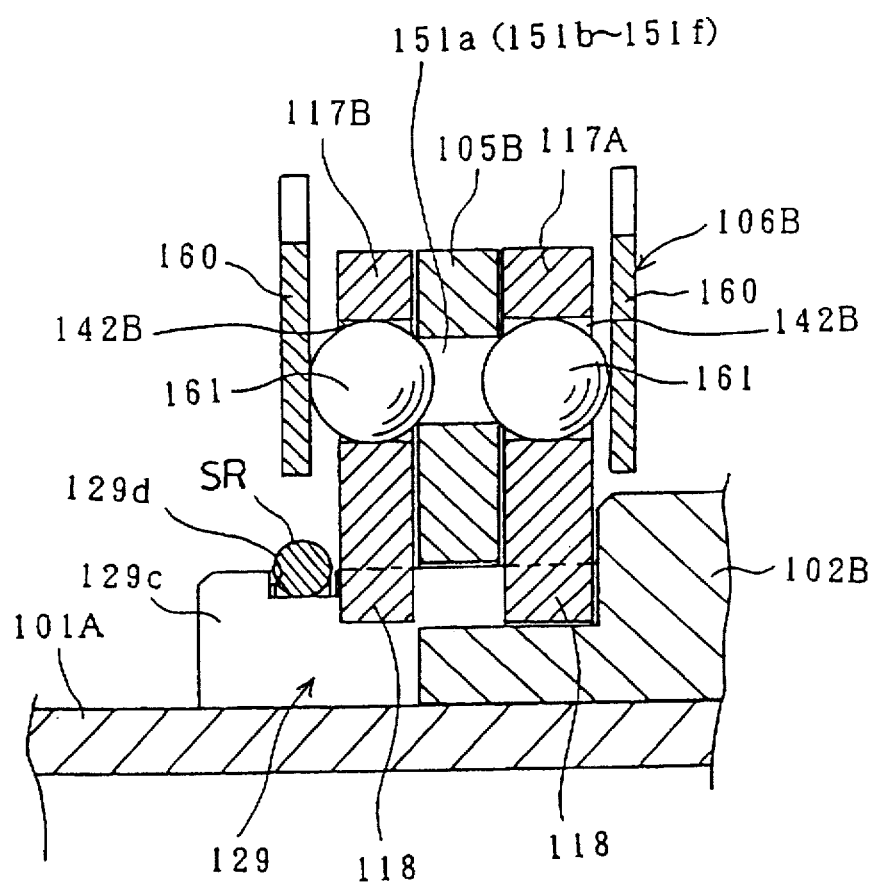
FIG. 21 is an enlarged fragmentary sectional view taken along lines X7—X7 in FIG. 14.

FIG. 21 is an enlarged fragmentary sectional view taken along lines X7–X7 in FIG. 14 and shows the stepwise positioning mechanism which is constituted by the two rings 117A, 117B, the positioning plate 105B, the spring member 106B and the balls 161. As shown in the same figure, the positioning member 105B is sandwiched between the two rings 117A, 117B with all of these components fitted on the cylindrical front portion 129 of the operation member 102B. As previously described, the two rings 117A, 117B rotate with the operation member 102B, but the positioning member 105B does not rotate with the operation member 102B. The snap ring SR is fitted in the grooves 129d on the outer surfaces of the plural projections 129c of the operation member 102B to axially retain the above-described components on the operation member 102B.

The balls 161 are fitted in the respective holes 142B of the two rings 117A, 117B, and the spring member 106B has a pair of opposite legs 160 for inwardly pressing the balls 161 into engagement with either one of the engaging holes 151a–151f of the positioning plate 105B. With this positioning mechanism, therefore, when the operation member 102B rotates, the two rings 117A, 117B, the spring member 106B and the balls 161 rotate with the operation member 102B while the positioning member 105B does not rotate.

Specifically, when the operation member 102B is rotationally operated to cause rotation of the rings 117A, 117B with the balls 161 engaging the engaging hole 151a of the positioning plate 105B for example, the balls 161 are thereby disengaged from the engaging hole 151a for engagement with the next engaging hole 151b. Similarly, the balls 161 can be brought into and out of successive engagement with the other engaging holes 151c–151f.

Figure 22:
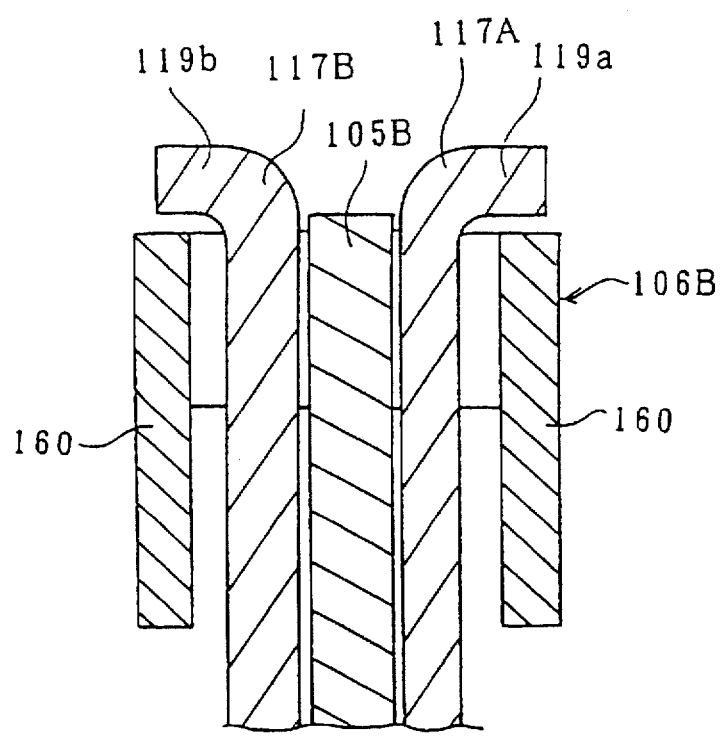
FIG. 22 is an enlarged fragmentary sectional view taken along lines X8—X8 in FIG. 14.

FIG. 22 is an enlarged fragmentary sectional view taken along lines X8—X8 in FIG. 14. As shown in this figure, the paired opposite legs 160 of the spring member 106B are arranged inwardly from the bent peripheral projections 119a, 119b of the two rings 117A, 117B for engagement therewith. By such an arrangement, the spring member 106B is retained by engagement with the two rings 117A, 117B to prevent falling from the rings 117A, 117B.

Referring to FIGS. 14 and 17, the first link 103B is pivotally connected to the ring 117B by the pin 131B which is inserted through a bore 130a at one end 103a of the first link into the hole 123B of the ring 117B. Therefore, when the operation member 102B is rotationally operated to cause rotation of the rings 117A, 117B, the end 103a of the first link 103B moves with the ring 117B circumferentially thereof.

Figure 23:
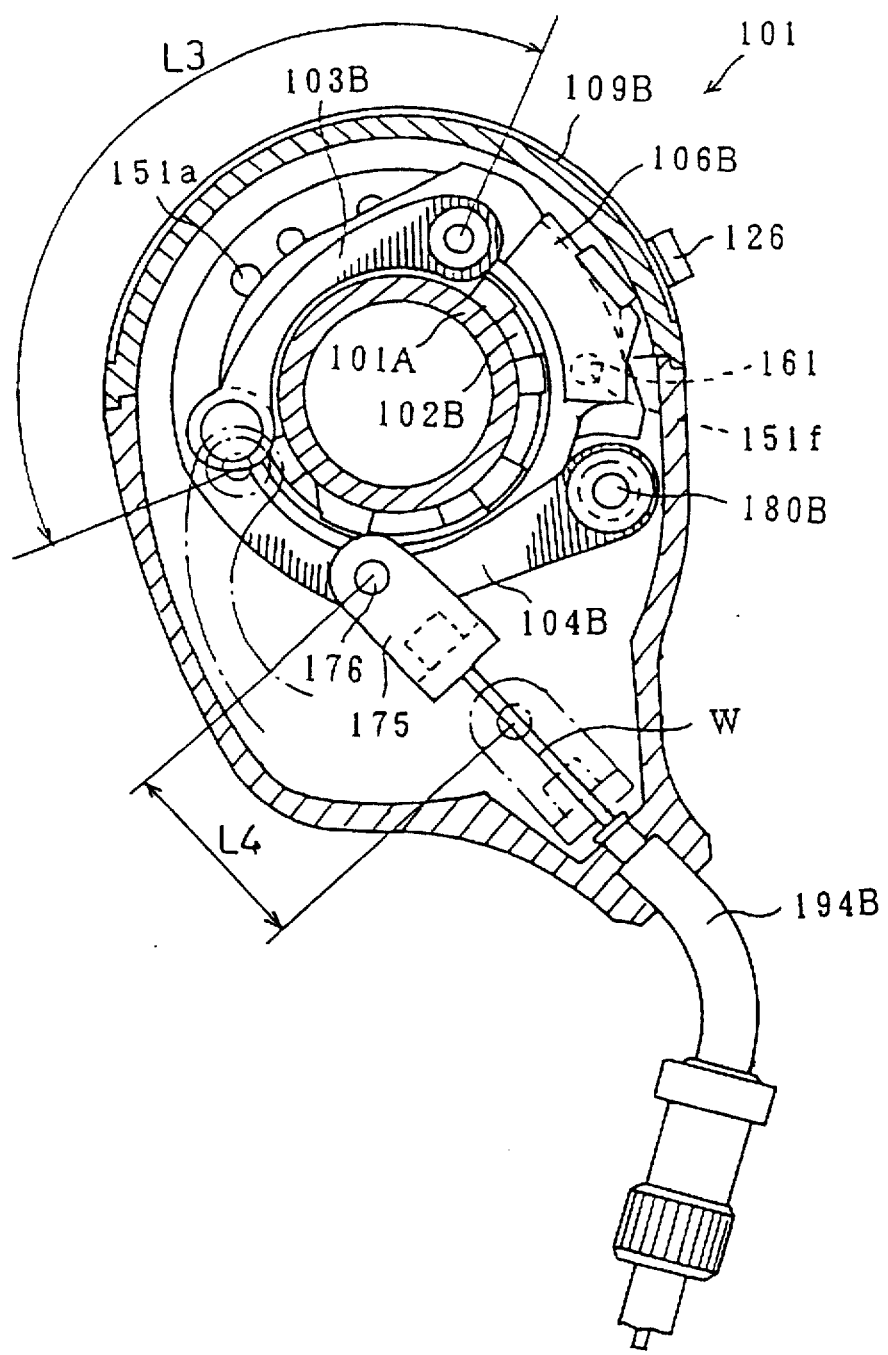
FIG. 23 is a sectional view illustrating the operation of the bicycle speed change operation device shown in FIG. 14.

The first link 103B is arcuate and has, at an inner side edge thereof, a concave portion 130 with a radius Rb of curvature which is equal or generally equal to the radius of the handlebar 101A. As shown in FIG. 23, when the operation member 102B is rotated, the first link 103B can be made to extend along the circumferential surface of the handlebar 101A, thereby increasing the maximum rotational angle of the operation member.

Referring to FIGS. 14 and 17, the second link 104B has one end 104a formed with a bore 140a in which the sleeve 187 fitted on the fixed shaft 180B is inserted. By this arrangement, the second link 104B is pivotable up and down about the fixed shaft 180B and the sleeve 187. On the other hand, a connection pin 148B is inserted in a bore 140b at the other end 104b of the second link 104B as well as another bore 130b at the other end 103b of the first link 103B. Thus, the end 104b of the second link 104B and the end 103b of the first link 103B are pivotally connected to each other.

As shown in FIG. 14, the second link 104B is pivotable up and down (vertically) below the bicycle handlebar 101A. Further, the first link 103B having its end 103b connected to the second link 104B is set to assume a generally vertical posture when the control cable W is not pulled or when the control cable W is pulled by a small amount. Thus, it is possible to prevent the first link 103B and the second link 104B from projecting outward forwardly or rearwardly from the handlebar 101A to a large extent. As a result, the device as a whole can be made to have a relatively small width longitudinally of the bicycle, thereby providing an improved appearance.

The second link 104B has a longitudinal center portion pivotally connected to a control cable bracket 175 by means of a pin 176. The bracket 175 has a bottom plate portion 175a formed with a hole 175b to allow insertion of the control cable W which has an end nipple 114 for engagement with the bottom plate portion 175a. Therefore, the control cable W is pulled or paid out by pivotal up-down movement of the second link 104B.

However, the control cable W is taken out from the upper end of a cable guide 194B in a direction N1 which generally coincides with the pivotal direction N2 of the connection point of the bracket 175 relative to the second link 104B. By this arrangement, the control cable W is kept to extend straight from the upper end of the cable guide 194B when pulled or paid out upon pivotal movement of the second link 104B. The control cable W will not oscillate vertically or laterally but will be always pulled along substantially the same straight path.

Referring to FIG. 17, the upper and lower members 191A, 191B of the housing cover 109B have respective clamp portions 198a, 198b for vertically sandwiching the handlebar 101A. The clamp portions 198a, 198b are fixed to the handlebar 101A by tightening bolts 191b and nuts 191c. Further, a set screw 182 is screwed into the lower member 191B into pressing contact with the outer surface of the handlebar 101A, thereby preventing the housing cover 109B from unexpectedly rotating.

The lower member 191B has a bottom portion formed with a bore 195B for fitting and retaining the upper end of the cable guide 194B. Further, the lower member 191B is also formed with a hole 185B for fixedly retaining the fixed shaft 180B which prevents rotation of the positioning plate 105B while serving as a pivotal center for the second link 104B.

With the bicycle speed change device 101 having the above-described structure, when the operation member 102B in the FIG. 14 position is rotated in the arrow b1 direction by such an angle as to assume the position of FIG. 23, the end 103a of the first link 103B following the rotation of the operation member 102B moves around the handlebar 101A by a predetermined amount L3. As a result, the second link 104B following the movement of the first link 103B is pivoted upward about the sleeve 187 at the end 104a of the second link, thereby causing the control cable bracket 175 connected to the second link 104B to move upward for pulling the control cable W.

In the above-described operation of pulling the control cable W, the first link 103B and the second link 104B work as a force magnifying mechanism. Therefore, every portion of the second link 104B moves by a smaller amount than the moving amount L3 of the end 103a of the first link 103B, so that the pulling amount L4 of the control cable W is considerably smaller than the moving amount L3 of the end 103a of the first link 103B. As a result, the rotational operating angle of the operation member 102B can be made large in comparison with the actual pulling amount of the control cable W, so that it becomes possible to reliably perform a speed change operation stepwise by a large angle rotation of the operation grip 128 fitted over the operation member 102B. Further, it is also possible to reduce the torque required for rotationally operating the operation member 102B.

Moreover, the control cable W pulled by the second link 104B is pulled straight or generally straight from the upper end of the cable guide 194B. As a result, no additional guide member is required for guiding the control cable W, thereby reducing the number of required components. Further, it is possible to reduce the frictional resistance against the control cable W at the time of pulling the control cable W, thereby an improved speed change operability.

On the other hand, when progressively rotating the operation member 102B, the balls 161 retained by the two rings 117A, 117B move relative to the positioning plate 105B which is non-rotatable on the operation member 102B. During such movement, each of the balls 161 displaces from the engaging hole 151a for coming into and out of successive engagement with the other engaging holes 151b–151f. Therefore, due to the function of the click mechanism or positioning mechanism wherein the ball 161 comes into engagement with either one of the engaging holes 151a–151f, it is possible to hold the two rings 117A, 117B and the operation member 102B at a desired angular position, thereby holding the rear derailleur at a desired speed position.

Further, the positioning mechanism constituted by the positioning plate 105B and the balls 161 is capable of providing an overshift operation, as described below.

Figure 24A:
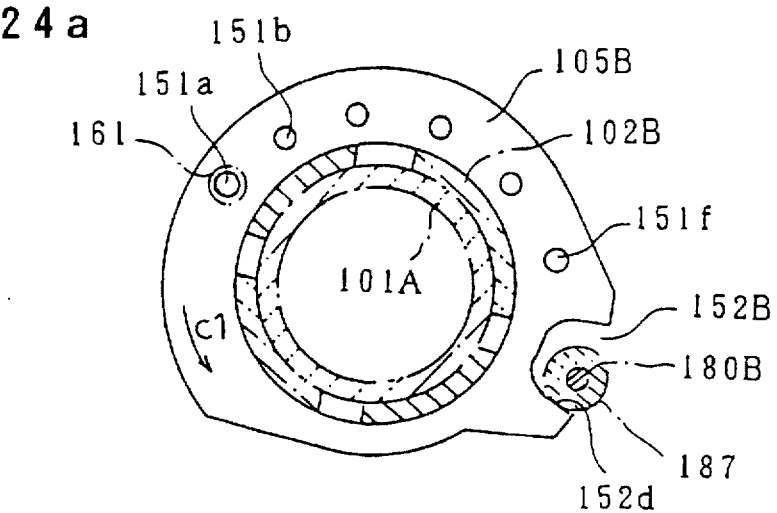
FIGS. 24a through 24c are views showing the operation of the positioning plate.

Specifically, the control cable W is always subjected to a spring force of the rear derailleur which acts to pull the cable toward the rear derailleur. Thus, when the bicycle user takes his or her hand off the operation grip 128 fitted over the operation member 102B, the positioning plate 105B in engagement with the balls 161 of the click mechanism tends to be rotated in the arrow c1 direction by the pull force of the control cable W toward the rear derailleur, as shown in FIG. 24a. Thus, the positioning plate 105B is kept stable in the state wherein one terminal edge 152d of the cutout 152B of the positioning plate 105B contacts the sleeve 187.

Figure 24B:
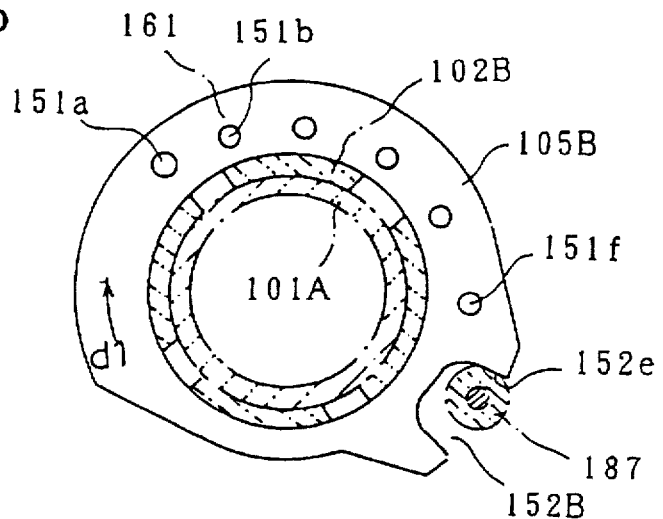
Figure 24C:
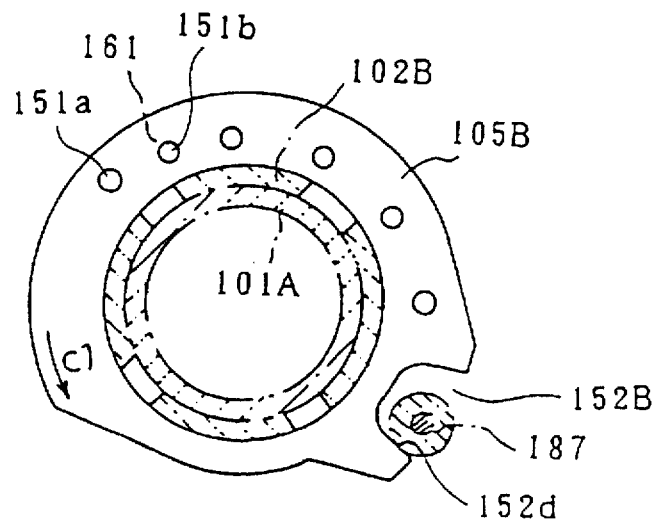

Then, upon rotation of the operation member 105B in the arrow d1 direction from e.g. the initial state wherein the balls 161 engage the engaging hole 151a of the positioning plate 105B to set the rear derailleur at the first speed, the balls 161 first disengage from the engaging hole 151a and thereafter come into engagement with the engaging hole 151b, as shown in FIG. 24b. However, even after this, the positioning plate 105 and the operation member 102B can rotate by a slight additional angle until the other terminal edge 152e of the cutout 152B of the positioning plate 105B contacts the sleeve 187. Therefore, by this additional rotation of the positioning plate 105B, it is possible to pull the control cable W in excess of the amount required for shifting the rear derailleur.

Upon subsequent liberation of the operation grip 128 from the user's hand, the pull force of the control cable W toward the rear derailleur causes the positioning plate 105B to rotate in the arrow c1 direction for returning to the initial angular position which is stable. In this way, the above-described click mechanism is capable of temporarily pulling the control cable W in excess of the required amount, thereby realizing a reliable speed change operation with an overshift of the derailleur.

Figure 25:
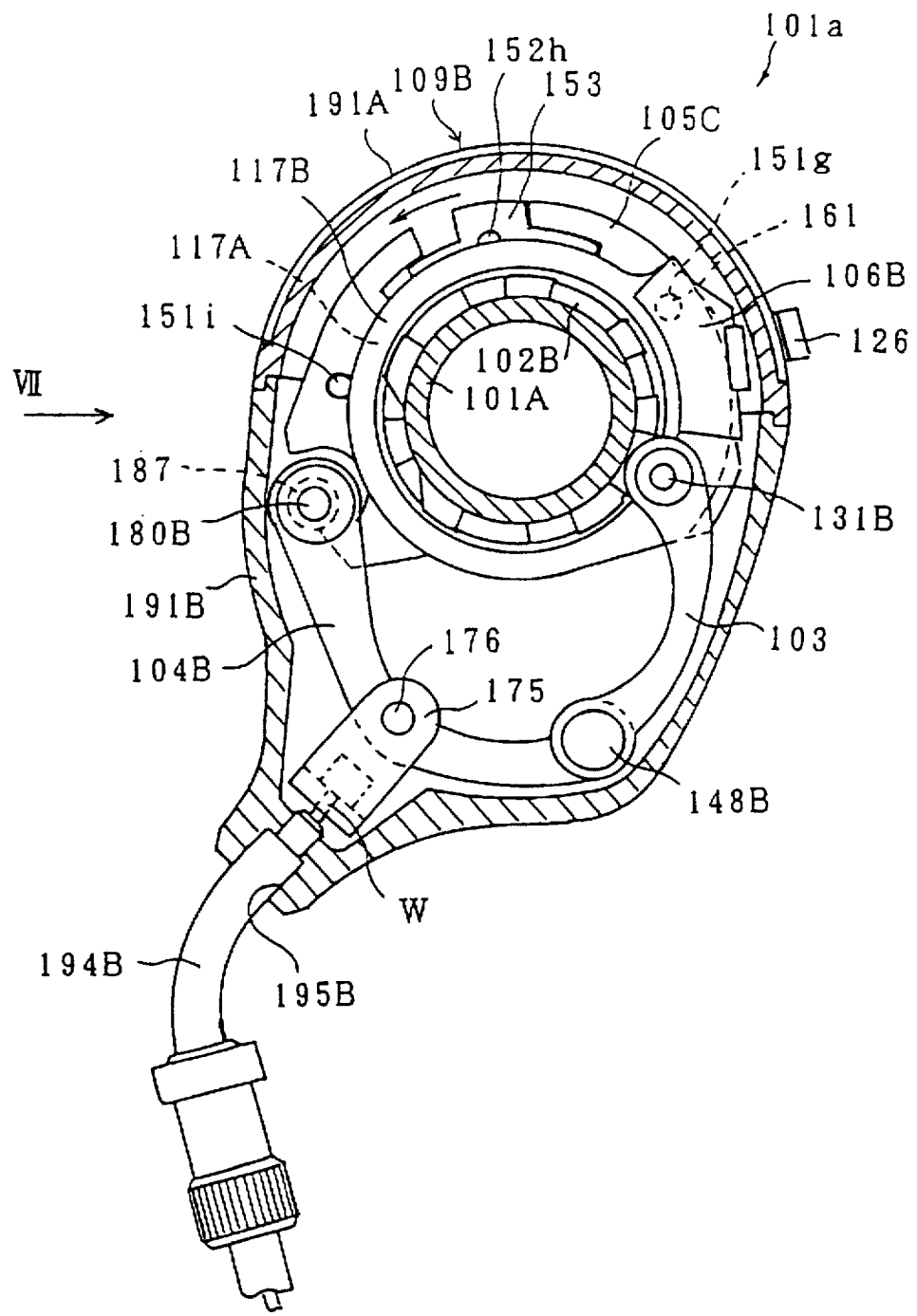
FIG. 25 is a sectional view showing a speed change operation device according to a third embodiment of the present invention.
Figure 26:
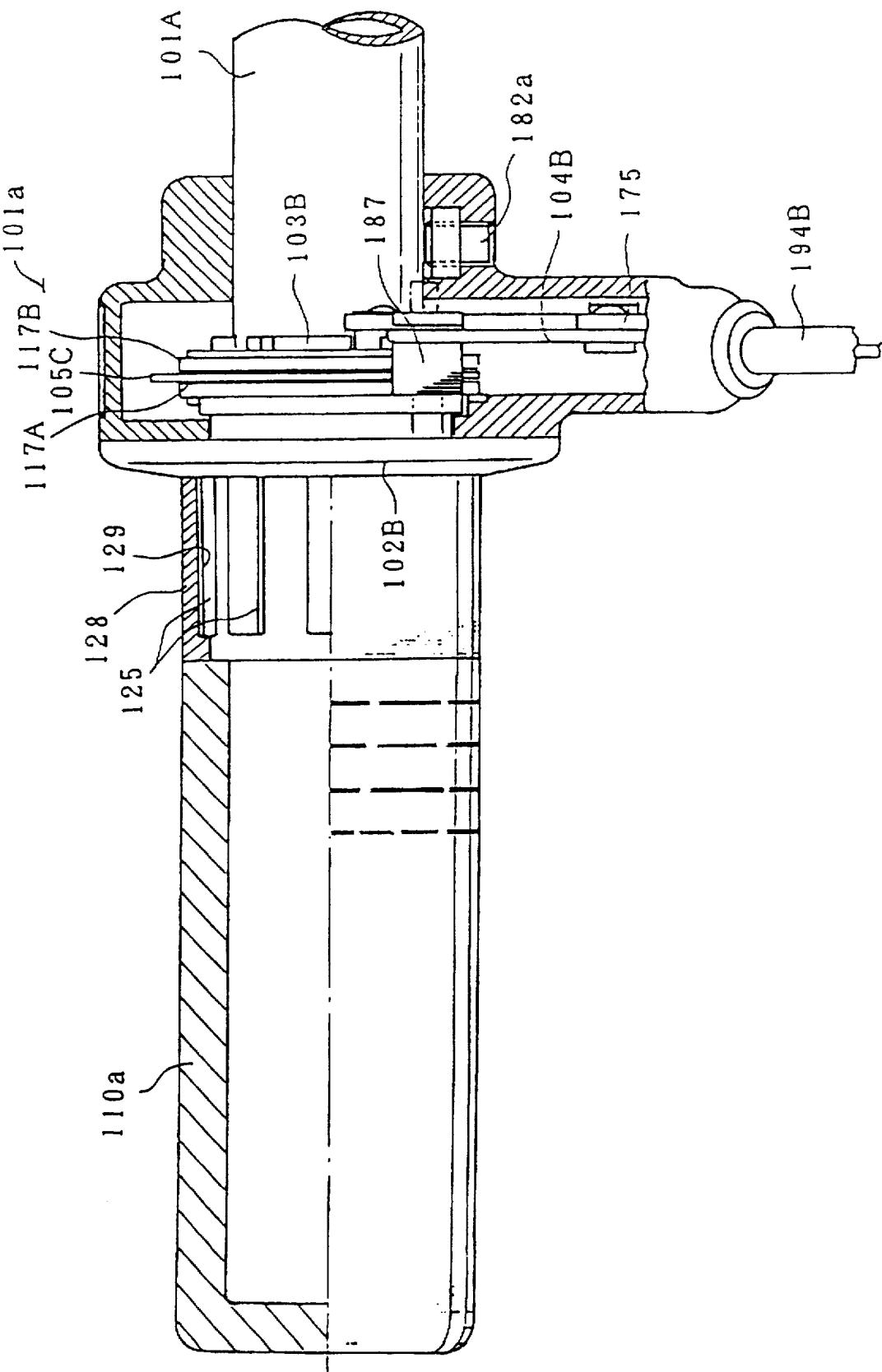
FIG. 26 is a fragmentary half-sectional view as seen in the direction of arrow VII in FIG. 25.

On the basis of the structure which incorporates the force magnifying mechanism, a grip type speed change device according to the third embodiment of the present invention is used to operate a front derailleur for a speed change and illustrated in FIGS. 25 through 27c. FIG. 25 is a sectional view of the speed change operation device 101a according to the third embodiment, whereas FIG. 26 is a fragmentary half-sectional view as seen in the direction of an arrow VII in FIG. 25.

The bicycle speed change operation device 101a is mounted adjacent to the left grip 110a of the handlebar 101A to operate the front derailleur which is used to shift the chain between the three sprockets S1, S2, S3 (FIG. 8) of the chainwheel (front gear). The same handlebar also carries the bicycle speed change operation device 101 for operating the rear derailleur.

The basic structure of the bicycle speed change operation device 101a is similar to that of the rear derailleur speed change operation device 101 already described with reference to FIGS. 14 through 24c, but is symmetrical in arrangement to the rear derailleur speed change operation device 101 mounted adjacent to the right grip 110 of the handlebar 101A. Thus, the front derailleur speed change operation device incorporates an operation member 102B, a first link 103B, a second link 104B, two rings 117A, 117B, a spring member 106B, balls 161, a housing cover 109B, and the like all of which are similar to those of the rear derailleur speed change operation device 101.

With the bicycle speed change operation device 101a, therefore, rotation of the operation member 102B causes the control cable W to be pulled or paid out for performing a stepwise speed change of the front derailleur. Further, the force magnifying mechanism constituted by the first link 103B, the second link 104B and the like makes it possible to increase the rotational angle of the operation member 102B while also reducing the torque required for rotationally operating the operation member 102B.

However, the bicycle speed change operation device 101a comprises a positioning plate 105C which comes into engagement with the balls 161 retained by the two rings 117A, 117B and which differs from the positioning plate 105B of the foregoing bicycle speed change operation device 101.

Figure 27A:
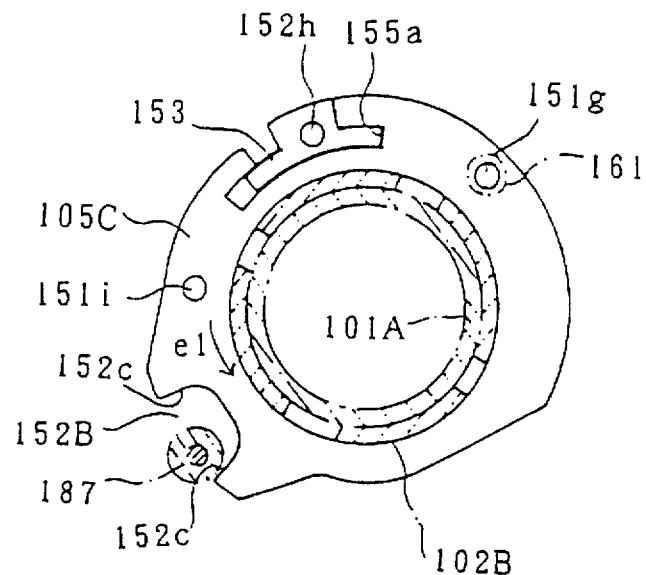
FIGS. 27a through 27c are views illustrating the operation of a positioning plate.
Figure 27B:
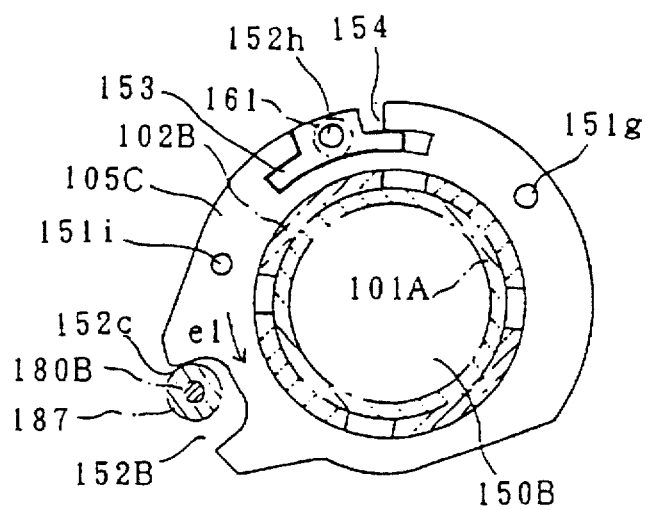

Specifically, as shown in FIG. 27b, the positioning plate 105C has an opening 150B for fitting the positioning plate 105C on the operation member 102B, a cutout 152B for receiving a sleeve 187 fitted over a fixed shaft 180B, and engaging holes 151g, 151i corresponding to the smallest and largest sprockets S1, S3, respectively, of the front gear which provide the first and third speeds. Between the two engaging holes 151g, 151i is formed a generally T-shaped cutout 154 which fittingly receives a movable member 153 (as the second part of the positioning member) with another engaging hole 152h for movement circumferentially of the positioning plate 105C.

Therefore, as described below, the positioning plate 105C provides an overshift function similarly to the speed change operation device 1 of the first embodiment described with reference to FIGS. 1 through 7. Specifically, as shown in FIG. 27a, it is now assumed that the front derailleur takes the first speed position in which the balls 161 retained by the rings 117A, 117B are held in engagement with the engaging hole 151g of the positioning plate 105C. If the operation member 102B is rotated in the arrow e1 direction from this position, the balls 161 disengage from the engaging hole 151g and thereafter engage the engaging hole 152h of the movable member 153, as shown in FIG. 27b. While the balls 161 engage the engaging hole 152h, the movable member 153 is movable in the same direction (arrow e1 direction) as the operation member 102B until one end 153a of the movable member 153 comes into abutment with one inner end wall 155a of the positioning plate 105C. Further, while the movable member 153 comes into abutment with the inner end wall 155a of the positioning plate 105C, the positioning plate 105C is additionally rotatable in the arrow e1 direction until one terminal wall 152c of the cutout 152B comes into abutment with the sleeve 187.

As a result, the displaceable angle of the movable member 153 and the rotatable angle of the positioning plate 105C are combined to provide an angle through which the operation member 102B can additionally rotate for pulling the control cable W in excess of the amount required for a desired speed change. In other words, a speed change from the first speed to the second speed may be performed with a large overshift. As previously described, with a bicycle multiple chainwheel, it is generally more difficult to perform a speed change from the first speed (smallest sprocket S1) to the second speed (intermediate sprocket S2) than from the second speed (intermediate sprocket S2) to the third speed (largest sprocket S3). Thus, an appropriate and reliable speed change operation may be realized if a large overshift is obtained in performing a speed change from the first speed to the second speed.

Figure 27C:
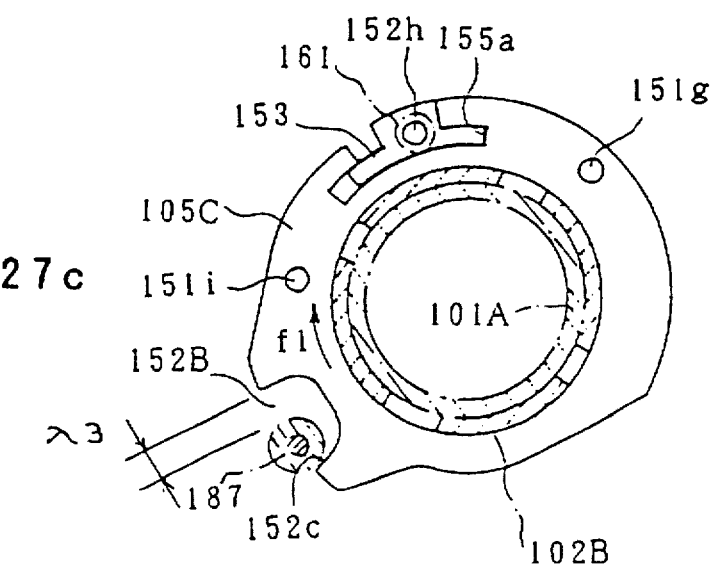

If the operation grip 128 fitted over the operation member 102B is liberated upon completing the speed change to the second speed, the tension of the control cable W causes the movable member 153 and the positioning plate 105C to return in the arrow f1 direction into the stable state, as shown in FIG. 27c. Therefore, the chain is held at a position exactly corresponding to the target sprocket.

When the balls 161 in engagement with the engaging hole 152h are brought into engagement with the next engaging hole 151i, it is not necessary to provide an overshift which is as large as is required for shifting from the first speed to the second speed, so that the movable member 153 does not provide an overshift. In this case, however, since the positioning plate 105C is pivotable within the range of the clearance λ3 between the cutout 152B and the sleeve 187, an appropriate overshift is obtainable for suitably shifting from the second speed to the third speed.

Figure 28:
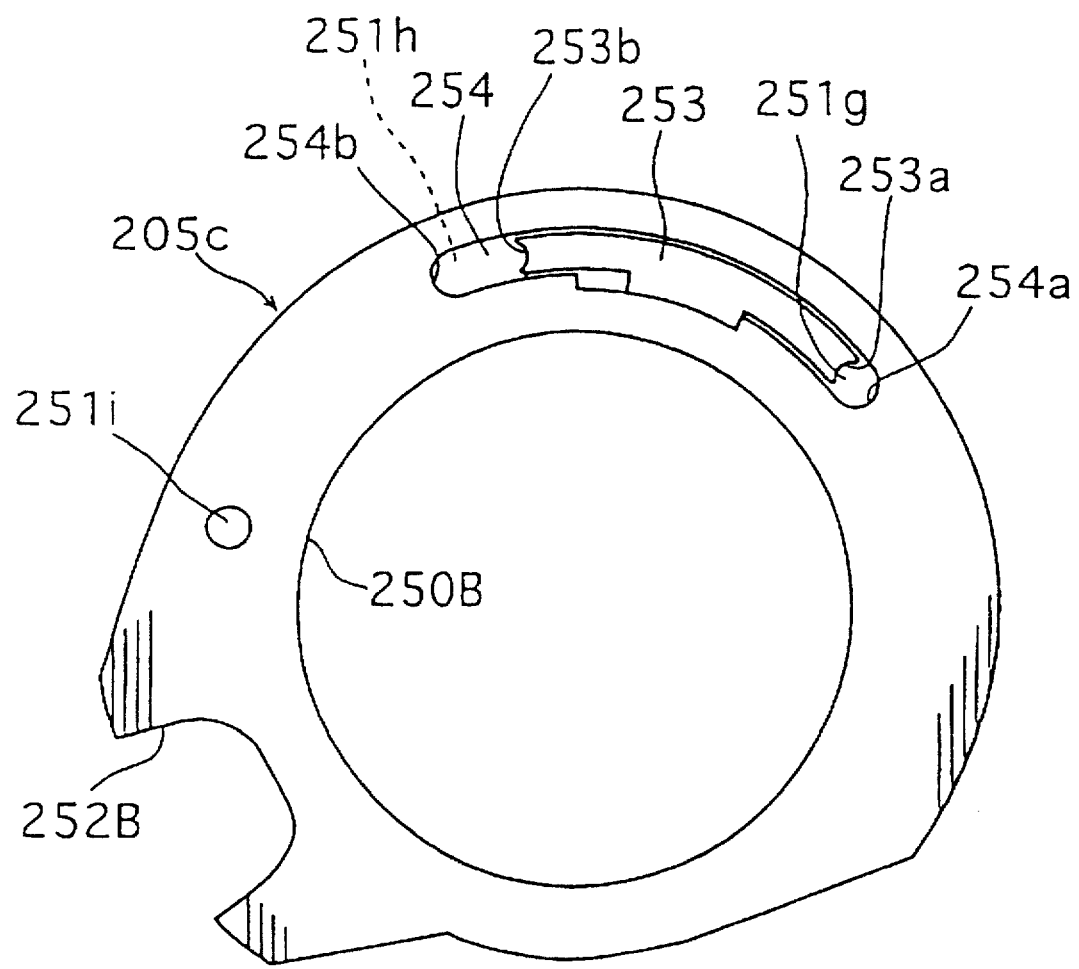
FIG. 28 is a front view illustrating a speed change operation device according to a fourth embodiment of the present invention.

Next, the fourth embodiment of the present invention is described with reference to FIGS. 28 through 29c.

In the fourth embodiment, the positioning plate 105C and movable member 153 of the third embodiment are further modified. Specifically, as shown in FIG. 28, a positioning plate 205C according to the fourth embodiment, while being similar to the positioning plate 105C of the third embodiment in that it has an opening 250B for fitting the positioning plate 205C on the operation member 102B as well as a cutout 252B for receiving the sleeve 187 fitted over the fixed shaft 180B, is modified with respect to the configuration of speed determining engaging holes 251g, 251h, 251i for engagement with the balls 161 retained by the rings 117A, 117B as well as with respect to the configuration of a movable member 253.

More specifically, the positioning plate 205C is formed with a generally T-shaped opening 254. The movable member 253 (as the second part of the positioning member) which is also generally T-shaped is fitted in the opening 254 for movement circumferentially of the positioning plate 205C within a predetermined distance. At both circumferential ends of the opening 254 are formed respective arcuately concave portions 254a, 254b, and respective arcuately concave portions 253a, 253b are also formed at both circumferential ends of the movable member 253. As shown in FIG. 28, when the movable member 253 is located at one end of its movement stroke, the arcuately concave portion 253a at one end of the movable member 253 cooperates with the arcuately concave portion 254a at one end of the opening 254 to form the engaging hole 251g corresponding to the first speed. When the movable member 253 is located at the other end of its movement stroke, the arcuately concave portion 253b at the other end of the movable member 253 cooperates with the arcuately concave portion 254b at the other end of the opening 254 to form the engaging hole 251h corresponding to the second speed. The engaging hole 251i corresponding to the third speed is independently formed at a position circumferentially spaced from the opening 254.

Figure 29A:
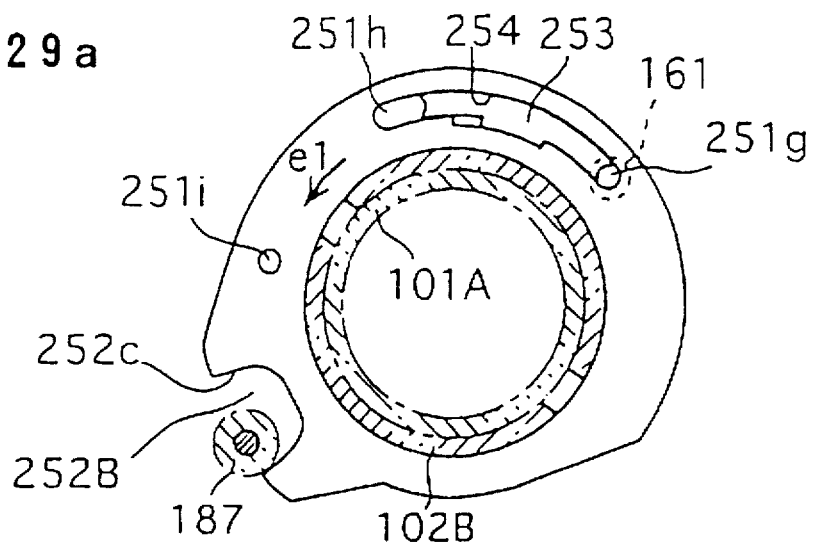
FIGS. 29a through 29c are views illustrating the operation of a positioning plate.
Figure 29B:
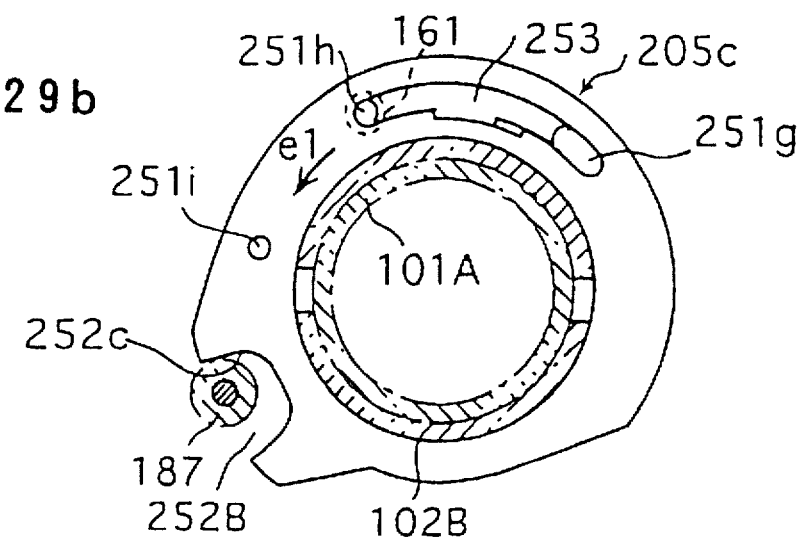

With the above-described arrangement, as shown in FIG. 29a, it is now assumed that the front derailleur takes the first speed position in which the balls 161 retained by the rings 117A, 117B are held in engagement with the engaging hole 251g of the positioning plate 205C. If the operation member 102B is rotated in the arrow e1 direction from this position, the balls 161 push the movable member 253 to the other end of its movement stroke and, after sliding on the surface of the movable member 253, come into engagement with the engaging hole 252h, as shown in FIG. 29b. At this time, the positioning plate 205C itself is additionally rotated from the position of FIG. 29a by the rotational force of the balls 161 acting in the arrow e1 direction until one terminal wall 252c of the cutout 252B comes into abutment with the sleeve 187.

As a result, the displaceable angle of the movable member 253 and the rotatable angle of the positioning plate 205C are combined to provide an angle through which the operation member 102B can additionally rotate for pulling the control cable W in excess of the amount required for a desired speed change. In other words, a speed change from the first speed to the second speed may be performed with a large overshift.

Figure 29C:
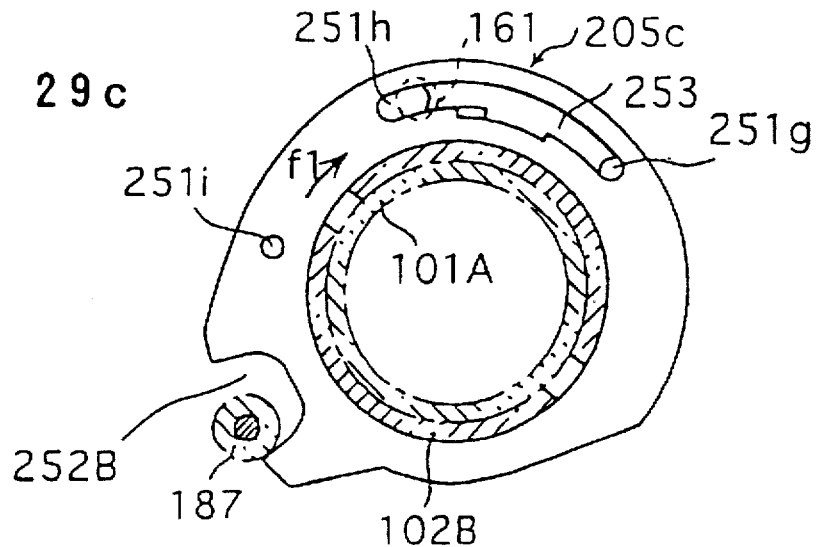

If the operation grip 128 fitted over the operation member 102B is liberated upon completing the speed change to the second speed, the tension of the control cable W causes the movable member 253 and the positioning plate 205C to return in the arrow f1 direction into the stable state, as shown in FIG. 29c.

When the balls 161 in engagement with the engaging hole 251h are brought into engagement with the next engaging hole 251i, it is not necessary to provide an overshift which is as large as is required for shifting from the first speed to the second speed, so that the movable member 253 does not provide an overshift. In this case, however, since the positioning plate 205C is pivotable within the range of the clearance λ3 between the cutout 252B and the sleeve 187, an appropriate overshift is obtainable for suitably shifting from the second speed to the third speed.

Of course, the scope of the present invention is not limited to the foregoing embodiments. In each of the embodiments, the engaging members constituting the positioning mechanism are associated with the operation member while the positioning member is associated with the support member. However, the scope of the present invention covers an arrangement wherein the engaging members may be associated with the support member while the positioning member may be associated with the operation member.

Further, in each of the embodiment, the positioning member is divided into two parts. However, it may be divided into a larger number of parts for more finely setting the amounts of overshifts.

I claim:

1. A bicycle speed change operation device comprising:

a support member;

an operation member supported for rotation about an axis of the support member, the operation member being operated to pull and pay out a cable connected to the operation member; and a positioning mechanism for holding the operation member at a selected one of different clicking positions relative to the support member, the clicking positions including at least a first position corresponding to a smallest sprocket, a second clicking position corresponding to an intermediate sprocket, and a third clicking position corresponding to a largest sprocket;

wherein the positioning mechanism comprises overshift imparting means for allowing the operation member to rotate relative to the support member by a first overshift amount when shifting the operation member from the first clicking position to the second clicking position and allowing the operation member to rotate relative to the support member by a second overshift amount different from the first overshift amount when shifting the operation member from the second clicking position to the third clicking position.

2. The speed change operation device according to claim 1, wherein the second overshift amount is smaller than the first overshift amount.

3. The speed change operation device according to claim 1, wherein the positioning mechanism comprises:

a positioning member provided on the support member and having a plurality of engaging portions corresponding to the clicking positions; and an engaging member provided on the operation member for rotation therewith into successive engagement with the engaging portions;

wherein the positioning member is divided into plural parts which include a first part which is supported on the support member for rotation relative to the support member within a first angle, and a second part which is supported on the first part for moving relative to the first part circumferentially about the axis of the support member within a second angle; and wherein at least one of the engaging portions is formed on the second part of the positioning member, and at least one of the engaging portions is formed on the first part of the positioning member.

4. The speed change operation device according to claim 3, wherein the first part of the positioning member has a cutout for loosely retaining the second part.

5. The speed change operation device according to claim 4, wherein the engaging member comprises two balls retained by respective retaining holes of two retainer plates each of which is rotatable with the operation member relative to the support member, the positioning member comprising a plate interposed between the retainer plates, the engaging portions comprising through-holes formed in the first and second parts of the positioning member.

6. The speed change operation device according to claim 5, wherein the balls are urged by a generally U-shaped leaf spring toward the positioning member, the spring being fitted on the two retainer plates to sandwich the two retainer plates on both sides.

7. The speed change operation device according to claim 6, wherein a laminate of the two retainer plates and the intervening positioning member is compressively retained by a spring clip.

8. The speed change operation device according to claim 1, wherein the positioning mechanism comprises:

a positioning member provided on the support member and having a plurality of engaging portions corresponding to the clicking positions; and an engaging member provided on the operation member for rotation therewith into successive engagement with the engaging portions;

wherein the positioning member is divided into plural parts which include a first part which is supported on the support member for rotation relative to the support member within a first angle, and a second part which is also supported on the first part for rotating relative to the support member within a second angle different from the first angle; and wherein at least one of the engaging portions is formed on the second part of the positioning member, and at least one of the engaging portions is formed on the first part of the positioning member.

9. The speed change operation device according to claim 8, wherein the engaging member comprises two balls retained by the operation member, one of the balls being spring-urged against the first part of the positioning member, the other of the balls being spring-urged against the second part of the positioning member.

10. The speed change operation device according to claim 1, wherein the support member comprises a lever shaft mounted on a bicycle frame, the operation member comprising an operation lever which includes a generally cylindrical boss portion rotatably fitted on the lever shaft, and an arm portion extending from the boss portion.

11. The speed change operation device according to claim 1, wherein the support member comprises a handlebar, and the operation member comprises an annular member which is rotated by a grip member fitted on the handlebar.

12. The speed change operation device according to claim 1, further comprising a built-in force magnifying mechanism which reduces a pulling or paying-out amount of the cable relative to a rotational amount of the operation member.

* * * * *